Nov. 1, 1932.   C. KOHM   1,886,194
METHOD AND APPARATUS FOR CHAIN MAKING
Filed July 8, 1931   9 Sheets-Sheet 4

Christian Kohm
INVENTOR

BY   ATTORNEYS

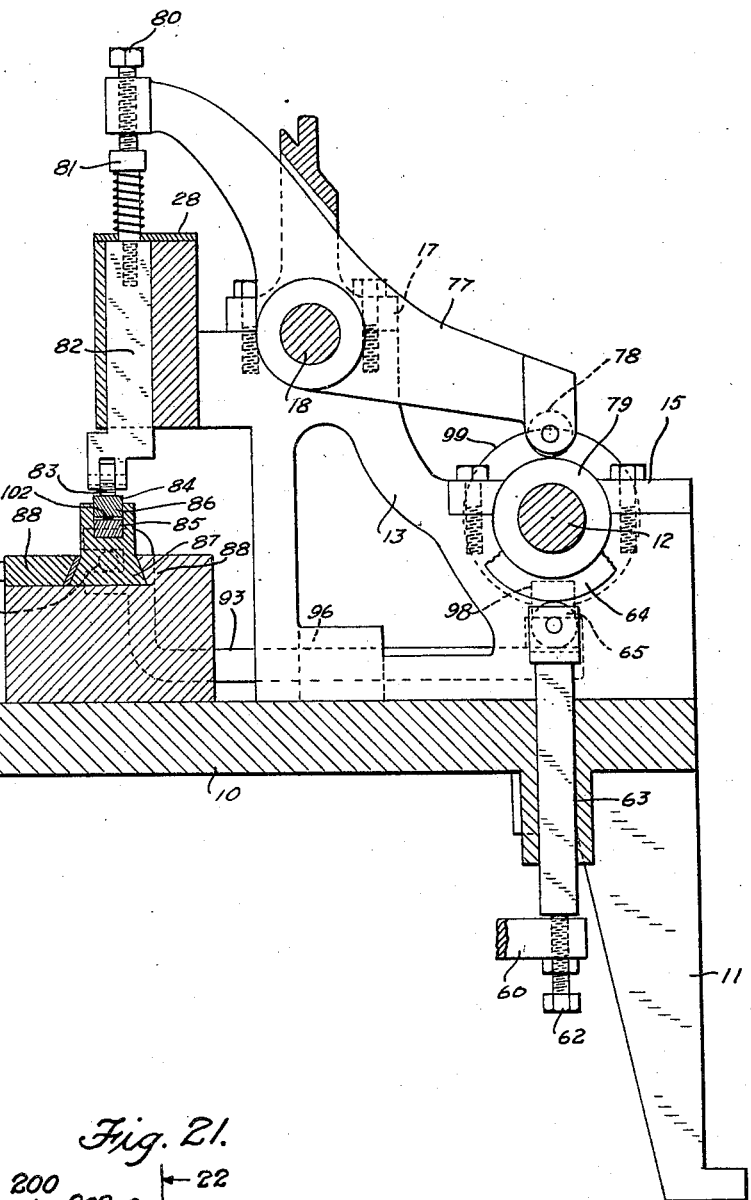
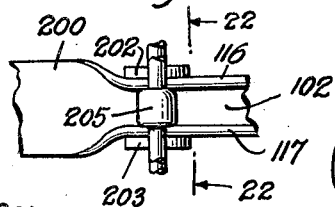
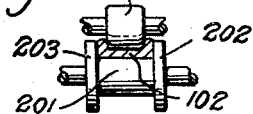

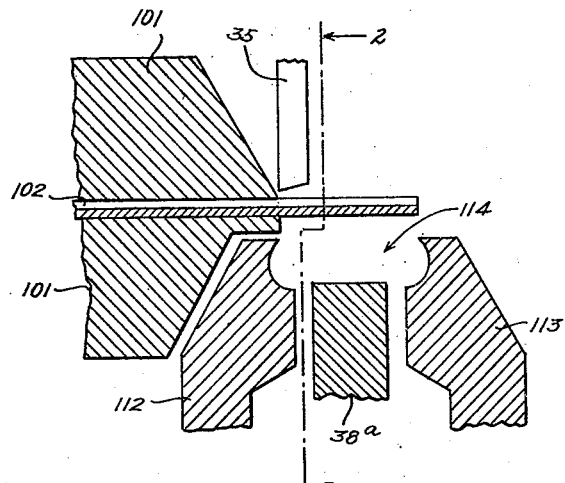
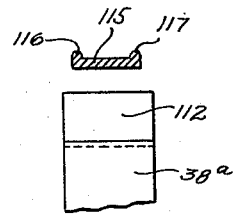
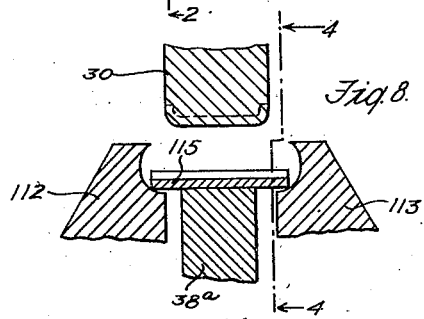
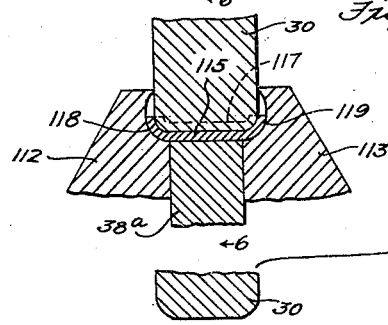
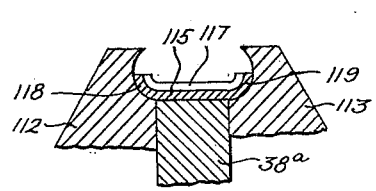
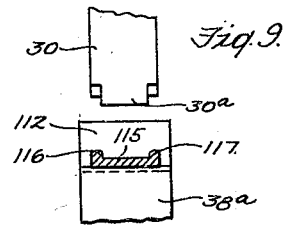
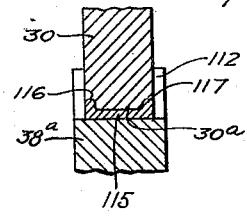

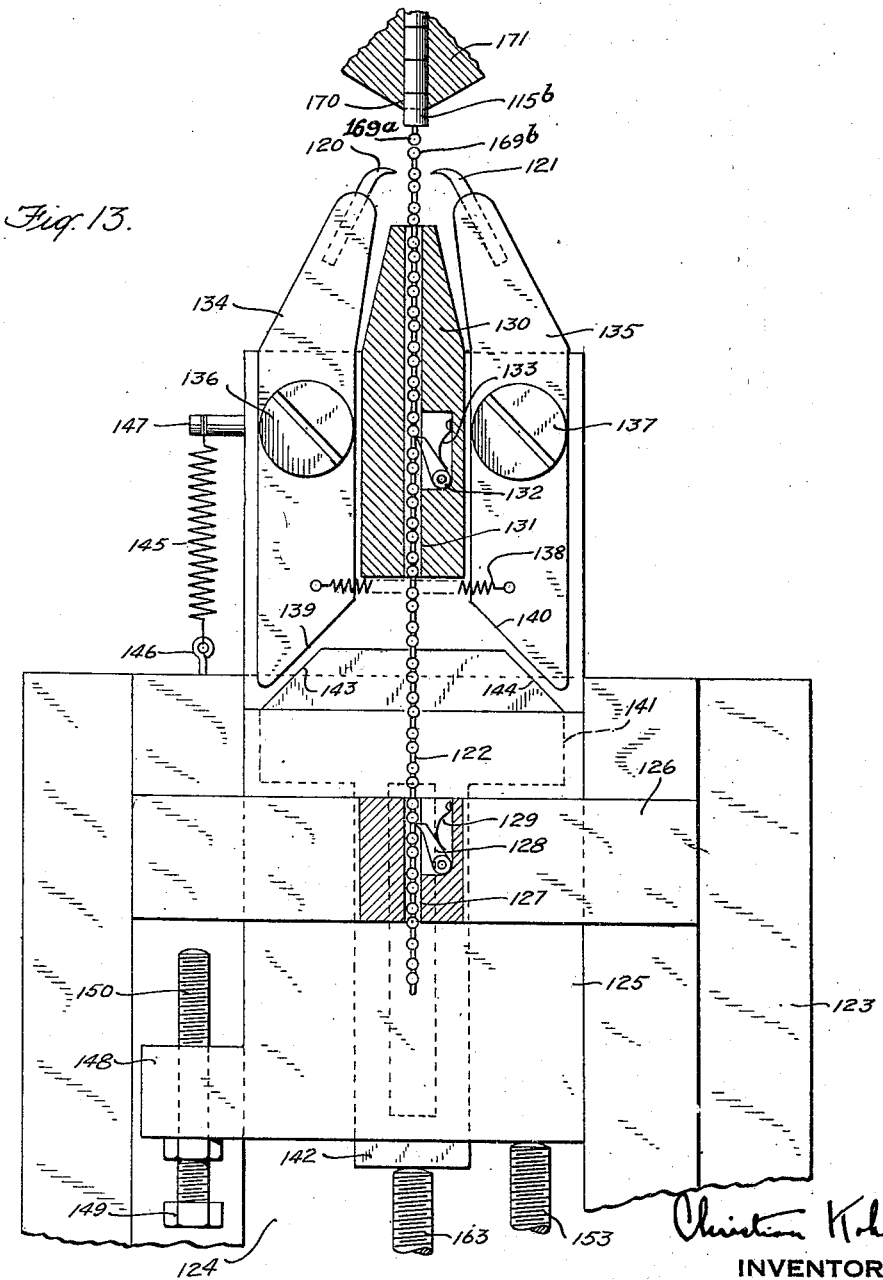

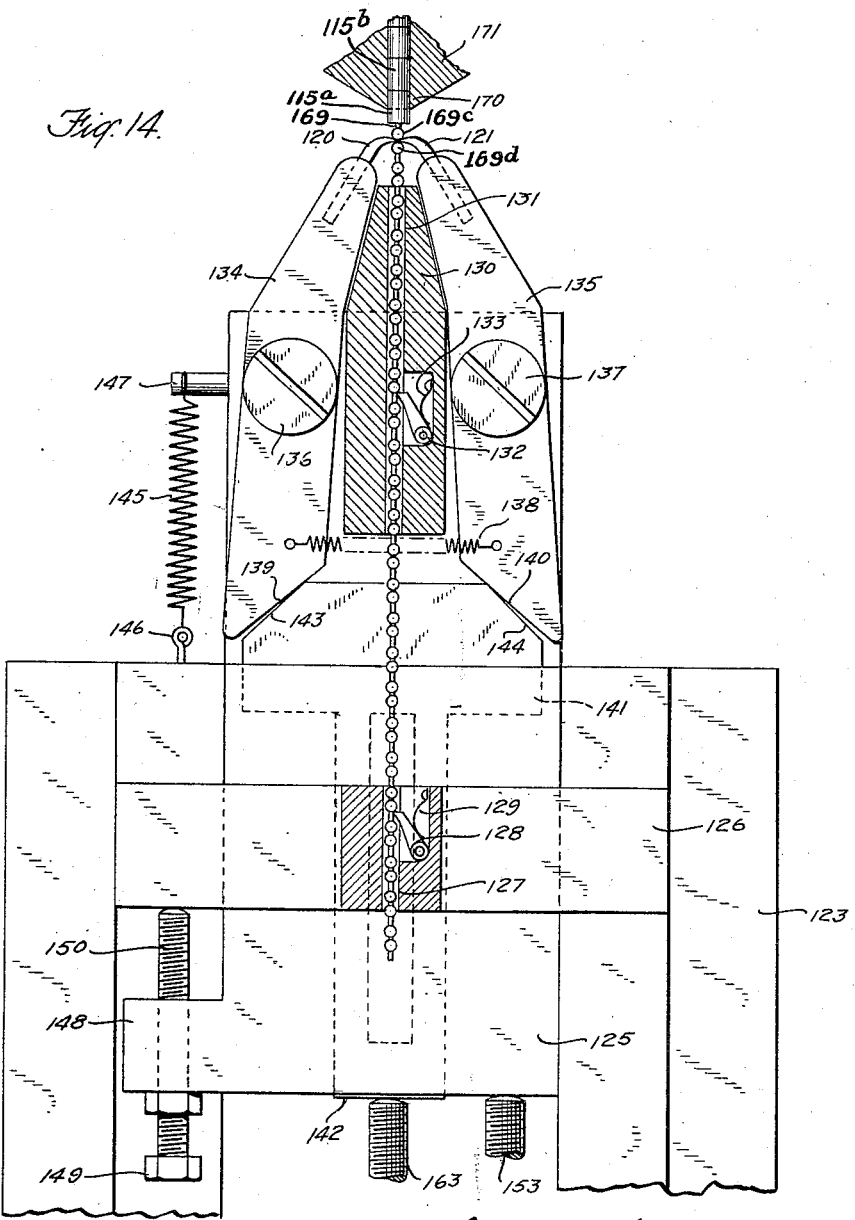

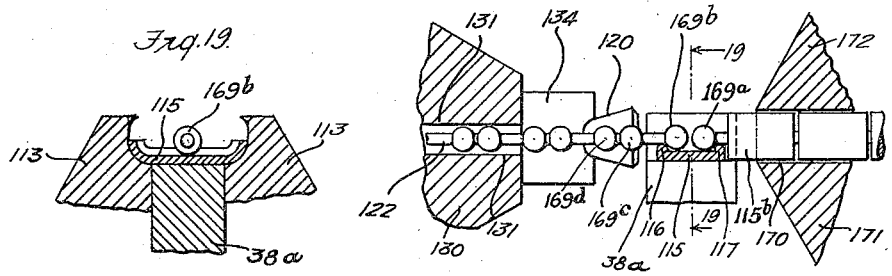
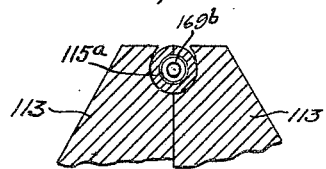
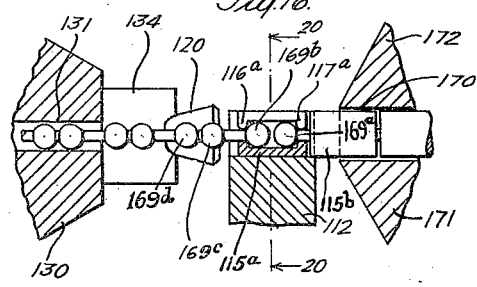
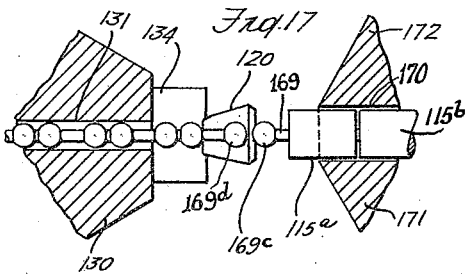
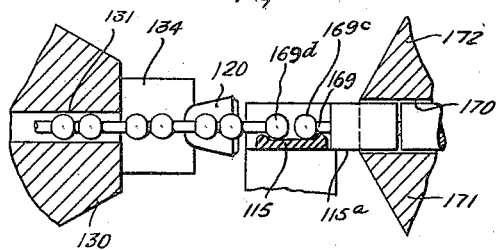

Patented Nov. 1, 1932

1,886,194

UNITED STATES PATENT OFFICE

CHRISTIAN KOHM, OF PROVIDENCE, RHODE ISLAND, ASSIGNOR TO EDWIN F. M. SPEIDEL, OF CRANSTON, RHODE ISLAND

METHOD AND APPARATUS FOR CHAIN MAKING

Application filed July 8, 1931. Serial No. 549,370.

This invention relates to a chain-making machine and a method for making chains.

One of the objects of this invention is to provide a machine for making chains which will be thoroughly durable, practical, and simple in construction, and of thoroughly dependable action. Another object of this invention is to provide a machine of the above character capable of consistently producing good results at high speed. Another object of this invention is to provide a machine of the above character whose operation will be efficient, reliable, and economical. Another object of this invention is to provide a machine of the above character which, when in operation, will require a minimum amount of care and attention. Another object of this invention is to provide a machine of the above character which will reduce materially the cost of producing a chain. Another object of this invention is to provide a machine of the above character which will operate efficiently with a comparatively small amount of power and which will produce a strong chain with a minimum amount of labor. Another object of this invention is to provide a simple and practical method of making a chain which can be readily and economically carried on in practice. Other objects will be in part obvious or in part pointed out hereinafter.

The invention accordingly consists in the features of construction, combinations of elements, arrangements of parts, and in the several steps and relation and order of each of the same to one or more of the others, all as will be illustratively described herein, and the scope of the application of which will be indicated in the following claims.

In the accompanying drawings, in which is shown a preferred embodiment of the mechanical features of my invention:

Figure 5 is a vertical sectional view taken along the line 5—5 of Figure 1;

Figure 6 is a detached longitudinal vertical cross-sectional view on an enlarged scale showing certain of the parts of my machine in an initial position and illustrating an early step in the formation of a link member according to my process;

Figure 7 is a sectional view of the parts as shown in Figure 6 as seen from the right thereof;

Figure 8 is a view of some of the parts shown in Figure 6 showing another operative position of these parts and illustrating a further step in my process;

Figure 9 is a sectional view of the parts as shown in Figure 8 as seen from the right thereof;

Figure 10 is a view similar to Figure 8, showing the parts of Figure 8 at the completion of the step for which they are placed in readiness as in Figure 8;

Figure 11 is a sectional view of Figure 10 as seen from the right thereof;

Figure 12 is a similar view showing the parts of Figure 10 in subsequent operative relation, together with certain other parts of my machine;

Figure 13 is a top plan view on an enlarged scale, certain parts being broken away or shown in section, of a feeding and cutting off mechanism shown at the lower part of Figure 1;

Figure 14 is a view similar to that of Figure 13 but shows the parts in a subsequent step of operation;

Figure 2:
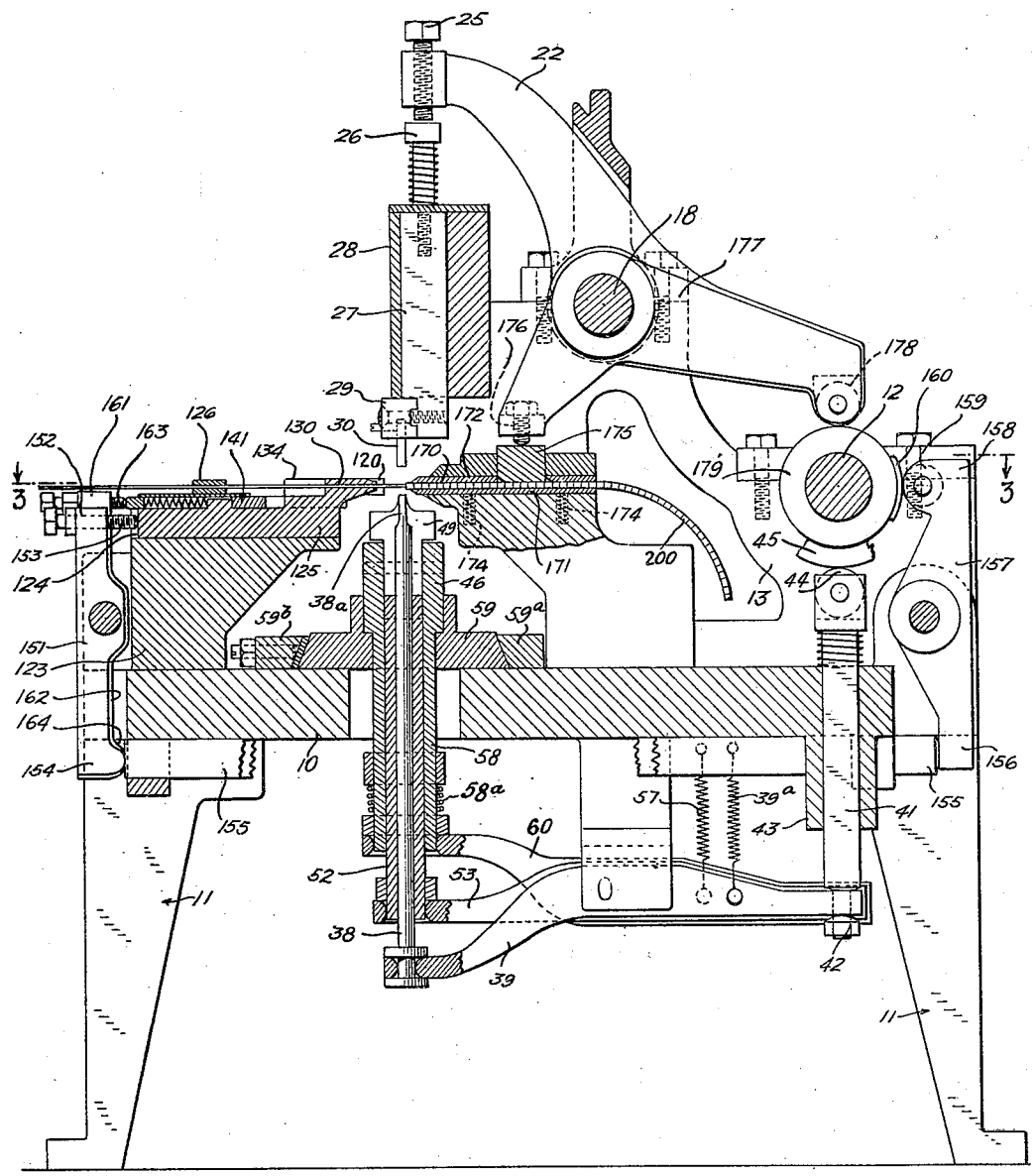
Figure 2 is a vertical sectional view as seen along the line 2—2 of Figure 1.

Figures 15, 16, 17, and 18 are detached fragmentary sectional views showing, in successive positions corresponding to successive further steps of my process, certain parts of Figure 2;

Figure 19 is a detached longitudinal vertical sectional view on an enlarged scale, similar to that of Figure 9 and shows certain additional parts of the apparatus, preliminary to the performing of another step in my process;

Figure 20 is a view similar to that of Figure 19 after the completion of this step of my process;

Figure 21 is a diagrammatic plan view of a possible form of apparatus which may be used in the practice of certain steps of my method, and Figure 22 is a vertical sectional view taken along the line 22—22 of Figure 21.

Similar reference characters refer to similar parts throughout the several views of the drawings.

Figure 1:
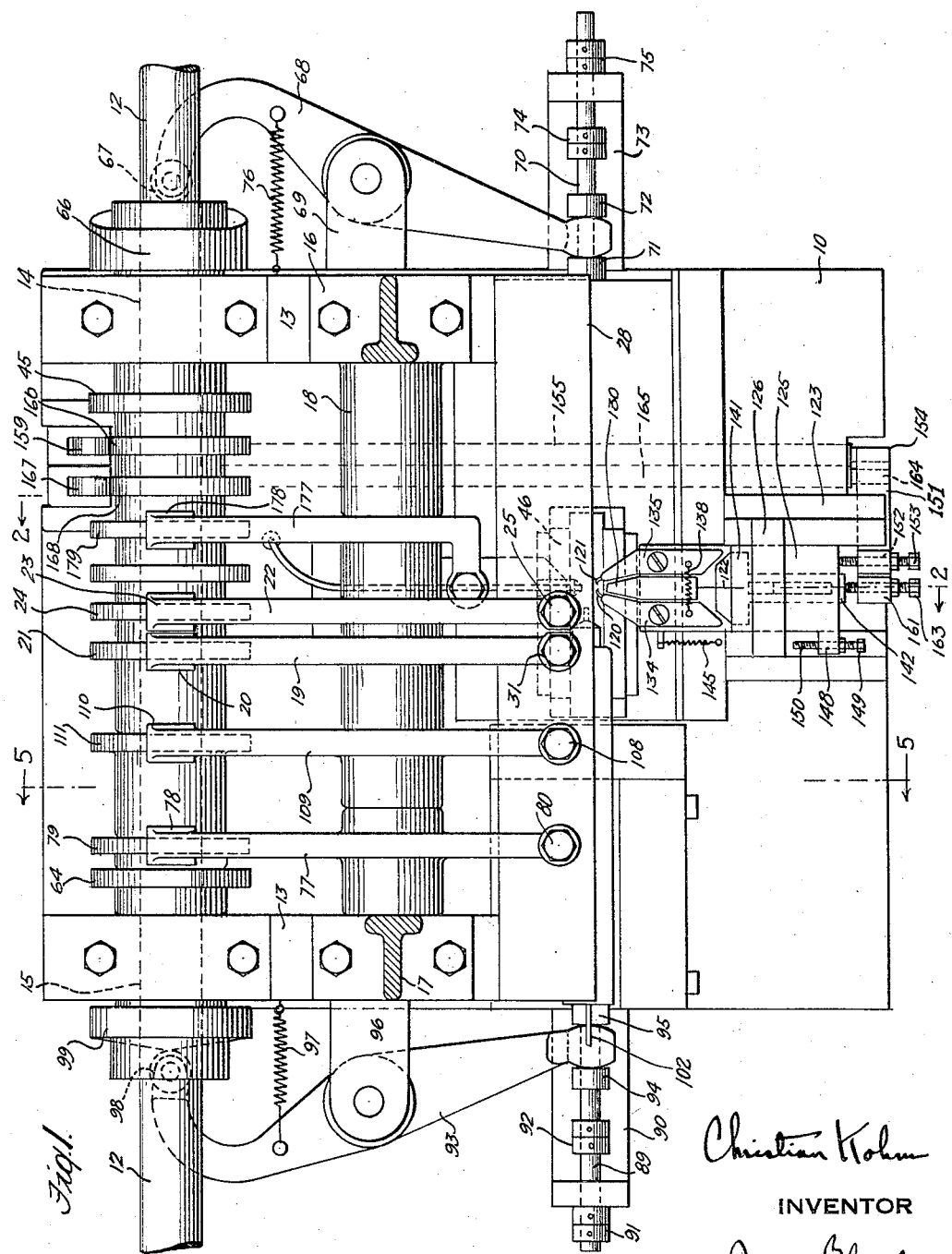
Figure 1 is a top plan view of the assembled machine.
Figure 3:
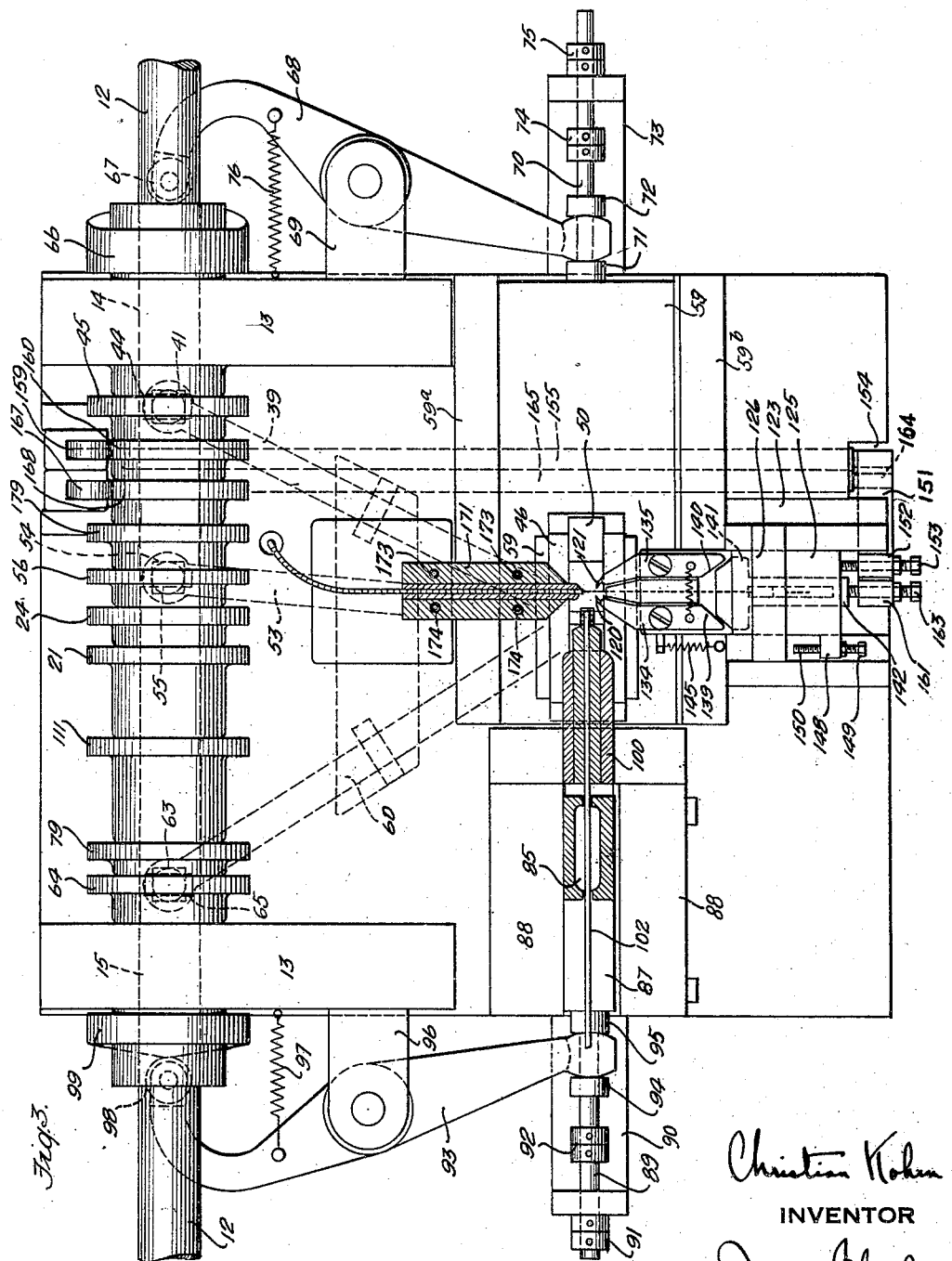
Figure 3 is a horizontal sectional view taken substantially along the line 3—3 of Figure 2.

Referring now to Figures 1 and 2, I have shown a bed or table 10 supported in any suitable manner as, for example, by legs generally indicated at 11, thus to provide space also under the bed for certain mechanisms. Mounted in suitable bearings 14 and 15 (Figure 1) spaced upwardly from and at the rear end of table 10 is a shaft 12 carrying a series of cams for operating or controlling certain of the moving parts of my machine. Shaft 12 is driven in any suitable way from any suitable source of driving power (not shown). A pair of side frames 13 (Figures 1, 5, and 4) rise upwardly from the table 10 at the rear side portions thereof and support the two bearings 14 and 15 (Figure 1) within which shaft 12 is rotatably mounted, shaft 12 thus being supported to extend across the rear portion of table 10 (Figures 1 and 3). Frames 13 extend forwardly and upwardly from bearings 14 and 15 so that they may provide a second set of bearings 16 and 17 (Figure 1) for a shaft 18 (Figures 2 and 5).

Turning particularly to Figure 1, a lever 19 is rotatably mounted upon shaft 18 and adapted to pivot about the axis of this shaft. Preferably rotatably mounted at one end of lever arm 19 is a roller 20 in engagement with a cam 21 carried by shaft 12. Similarly mounted to swing about shaft 18 is a lever 22 having rotatably mounted at one end thereof a roller 23 in engagement with a cam 24 mounted upon shaft 12. Thus, as shaft 12 is rotated, levers 19 and 22 are actuated to move about shaft 18 as an axis, the character of their movements depending upon the contours of cams 21 and 24 respectively. At the upper end of lever 22 (see Figures 2 and 4) is a bolt 25 threaded therein and extending through the bottom thereof as is more clearly shown in Figure 2. Thus, bolt 25 or the end of lever arm 22 is in registry with a bolt 26 preferably threaded into a member 27. Member 27 is slidably mounted in any suitable manner within a retaining guide box 28 that is secured at its ends to side frames 13 and at its lower end is attached a chuck 29 of any suitable construction adapted to hold a tool 30.

Turning back to Figure 1, lever 19 is also provided with a bolt 31 extending through its free end in a manner substantially similar to bolt 25 in lever 22. As is more clearly shown in Figure 4, bolt 31 is in substantial registry with a bolt 32 threaded into or secured to a member 33 slidably mounted within retaining guide box 28. Attached to the lower end of member 33 is a chuck 34 adapted to hold a tool 35 therein, tool 35 preferably taking the form of a knife-like member. Thus, as shaft 12 rotates to actuate levers 19 and 22 as described above, bolts 25 and 31 engage bolts 26 and 32 respectively to actuate members 27 and 33 in a downward direction as viewed in Figure 4, this action causing a resultant downward movement of tools 35 and 30. In order that tools 30 and 35 may again resume their normal positions after actuation by levers 19 and 22, I have provided springs 36 and 37 preferably mounted upon bolts 26 and 32 and seated between the heads of these respective bolts and the top of retaining guide box 28. Thus, upon release of pressure from levers 19 and 22, springs 36 and 37 act to return tools 30 and 35 to their normal position, these springs also insuring a constant operating contact between the levers and cams 21 and 24 to prevent lost motion between the parts. Furthermore, the contour of cam 21, which actuates lever arm 19, is of such a nature with respect to the contour of cam 24 actuating lever arm 22, that tool 35 is moved downwardly before tool 30. It will be seen that by adjusting bolts 25 and 31, I am able to determine the locus of the range of action of tool members 35 and 30.

Figure 4:
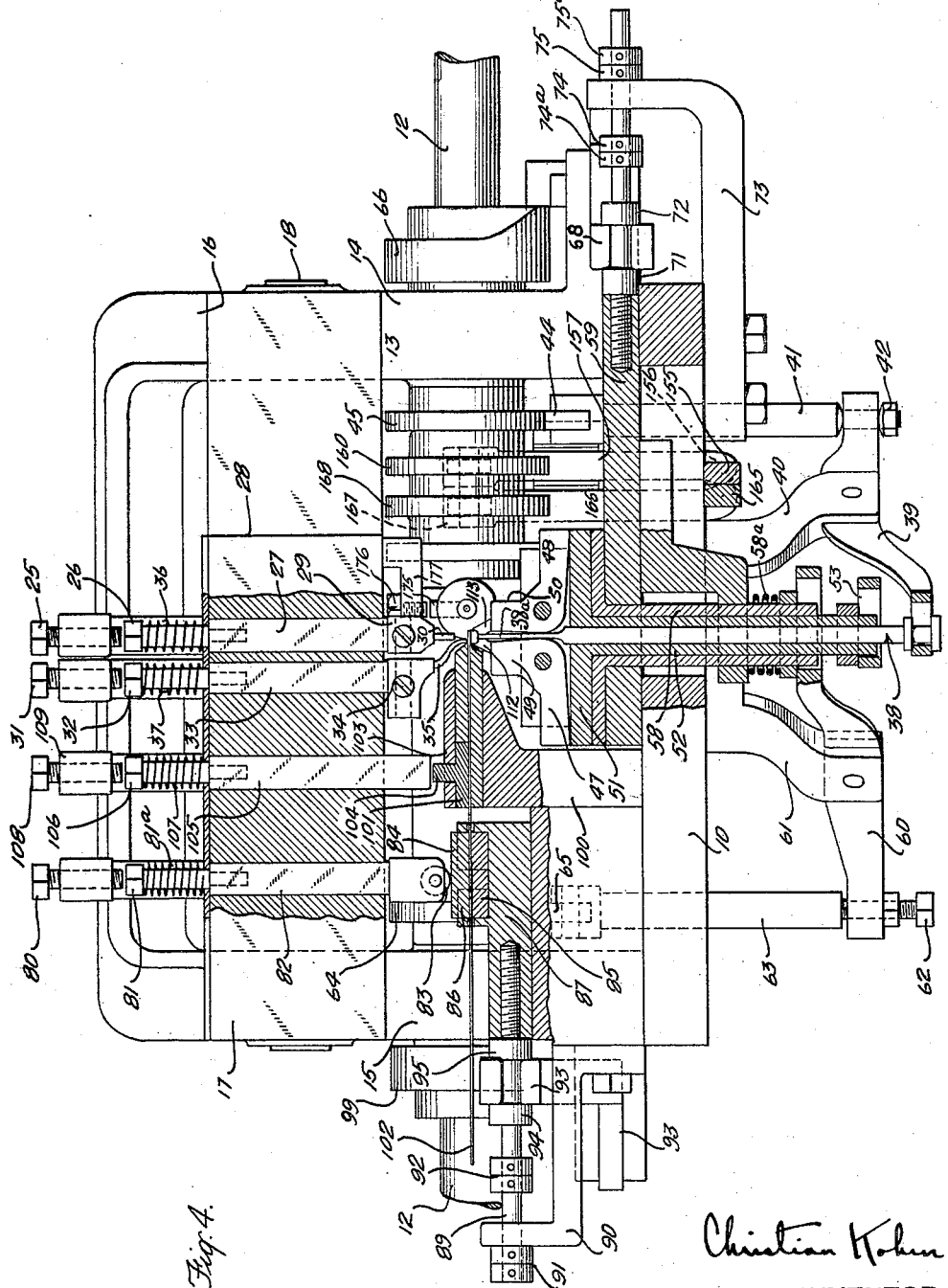
Figure 4 is a front view as seen from the bottom of Figure 1, certain parts being shown in section.

Positioned immediately below tool 30, or in registry therewith as most clearly shown in Figures 2 and 4, is a rod generally indicated at 38, a portion of which forms a tool member 38a at the upper end thereof, the other end thereof being secured in any suitable manner to one end of a lever 39. Rod 38 passes through table 10 and is at substantial right angles to the plane thereof. Lever 39 is pivotally mounted upon a member 40 extending downwardly and preferably secured to the bottom of table 10. Secured to the opposite end of lever 39 is a rod 41, the manner of attachment of these parts preferably taking the form of a bolt 42 extending through lever 39 and threaded into rod 41. Rod 41 extends through table 10, as more clearly shown in Figure 2, and is slidably mounted within a sleeve 43 secured to the bottom of table 10. Preferably I provide a roller 44 rotatably mounted in the uper end of rod 41 and adapted to engage a cam 45 secured to shaft 12 (Figure 4). Thus, upon rotation of shaft 12, lever arm 39 pivots about member 40 due to actuation from rod 41 to move rod 38 and tool member 38a in a vertical direction with respect to table 10 and its connected parts and the character of this action is dependent upon the contour of cam 45 as will be more fully described hereinafter.

Pivotally mounted within a U-shaped channel member 46 (Figure 2) are two members 47 and 48 (Figure 4), thus mounted upon the opposite sides of tool member 38a as viewed in Figure 4. The pivotal points of members 47 and 48 are sufficiently spaced from member 38a so that right angle projections 49 and 50 of these members respectively may move toward and away from tool member 38a, as they pivot about their pivotal axes. The bases of members 47 and 48, as viewed in Figure 4, are angular with respect to the plane of table 10, the exterior ends thereof thus extending to points below the bases thereof in the vicinity of their pivotal points.

Positioned immediately below members 47 and 48 is a T-shaped member 51 (Figures 2 and 4) slidably mounted about rod 38. Thus, the lower end of T-shaped member 51 assumes the form of a sleeve 52. Sleeve 52 extends through table 10 and is secured to a lever 53 (Figure 2) pivotally mounted to a member (not illustrated), extending from the bottom of table 10 similar in construction to member 40 which pivotally supports lever 39 (Figure 4). Secured to the rear end of lever arm 53 as viewed in Figure 3 is a rod 54 similar in construction and action to rod 41. Thus, I preferably mount a roller 55 in the upper end of rod 54, this roller engaging a cam 56 mounted upon shaft 12. As shaft 12 rotates, cam 56 actuates lever arm 53 to produce vertical motion in sleeve 52 with respect to table 10, thus actuating T-shaped member 51 in vertical direction.

As sleeve 52 is moved in an upward direction due to the above described action, member 51 engages the exterior ends of members 47 and 48 and consequently these members pivot so that right angle projections 49 and 50 thereof move toward each other and, upon the downward movement of member 51, projections 49 and 50 drop away from each other due either to the action of gravity or the provision of springs (not illustrated). To facilitate this movement of member 51, I preferably provide a spring 57 (Figure 2) secured to the bottom of table 10 and to lever 53. Thus the tension of spring 57 acts against the action of rod 54 to bring sleeve 52 to its normal position upon release of pressure therefrom and also insures contact of roller 55 with cam 56.

Referring to Figure 2, member 46 within which members 47 and 48 are pivotally mounted and member 51 is slidably mounted, assumes the form of a sleeve 58, this sleeve being slidably mounted about sleeve 52 thus extending through a slide 59 and table 10. Slide 59 slides in ways 59a and 59b, the coacting parts of which are bevelled to prevent vertical displacement thereof. Thus this slide may move in a lateral direction or a left and right hand direction as viewed in Figure 4 and, in so moving, carries member 46 and its connected parts with it. Member 46 is so seated within slide 59 that it may move vertically with respect to the table 10 and slide 59 and may move in a right and left hand direction, as viewed in Figure 4, with slide 59. As more clearly illustrated in Figure 4, sleeve 58 is connected to one end of a lever 60 pivotally mounted upon a member 61 extending downwardly preferably from the bottom of table 10. Secured to the opposite end of lever 60, as, for example, by a bolt 62, is a rod 63 substantially at right angles thereto and in registry with a cam 64 mounted upon shaft 12. Preferably I provide a roller 65 rotatably mounted at one end of rod 63 to engage cam 64. Thus, vertical motion may be transferred to rod 63 upon the rotation of shaft 12, this action being characterized by the contour of the cam. This vertical motion created in rod 63 by cam 64 is transferred by lever 60 to sleeve 58 against the action of spring 58a seated between the bottom of table 10 and lever 60, thus acting to move member 46 in an upward and downward direction as viewed in Figure 4. It will be noted that such vertical movement of member 46 is also transferred to members 47, 48 and 51 as these parts are mounted therein. Thus, the vertical position of members 47 and 48 with respect to table 10 and tools 35 and 30 is dependent upon the contour of cam 64, the exact nature of which will be described more fully hereinafter.

Turning next to Figure 1, there is shown mounted upon the right-hand end of shaft 12, a side-face cam 66 coacting with a roller 67 rotatably mounted on one end of a lever 68. Lever 68 is pivotally mounted upon a member 69 of any desired construction and preferably extending laterally from the right-hand side frame 13. Lever 68 may be secured to a rod 70 in any convenient manner, the rod 70 preferably passing through the end of lever 68 and provided with two threaded members 71 and 72 threaded thereupon. Thus, the position of lever 68 upon rod 70 may be adjusted by means of these two threaded members. Rod 70 is slidably connected to a right-angled member 73 (lower right-hand portion of Figure 4) extending from and secured to table 10. Two stops 74 and 75 may be secured to rod 70 upon the opposite sides of member 73 and these members may also be threaded thereupon in order to afford means of adjustment if desirable, lock nuts 74a and 75a locking the stops in position. Rod 70 is preferably threaded into slide 59 or secured thereto in any convenient manner as more fully shown in Figure 4. Thus, upon rotation of shaft 12, lever arm 68 coacting with cam 66 acts to impart lateral motion to rod 70, giving slide 59 and the parts carried thereby, a left and right hand direction of motion as viewed in Figures 1, 3 and 4. In order to facilitate this action, preferably I provide a spring 76 (Figure 1) secured to frame 13 and at one end of lever 68, the tension thereof acting against the pressure created by cam 66 to insure that the motion of lever 68 will correspond to the contour of the cam.

As described above, cam 64 tends to move member 46 in a vertical direction and cam 66 moves member 46 in a lateral direction, all with respect to table 10. The contours of these cams are so arranged with respect to each other that as member 46 moves to the right to a new position, as viewed in Figure 4, it also moves upwardly and upon reaching this new position remains there for a time or hesitates before moving back to its former position. Thus for purposes of illustration, I assume that member 46 has two positions, namely, the position shown in Figure 4 and a "new" position to the right and higher than this position. The locality of member 46 at any given time during the action of the machine is thus dependent upon the action and consequently the contours of cams 64 and 66.

Still referring to Figure 1 and also to Figure 5, there is shown rotatably mounted upon shaft 18, a lever 77 upon one end of which is preferably rotatably mounted a roller 78 engaging and in registry with a cam 79 secured to shaft 12. The other end of lever 77 has threaded therethrough a bolt 80 in registry with a bolt 81 (Figure 4), and bolt 81 is threaded into or secured to a member 82 slidably mounted within retaining guide box 28. Preferably I provide a roller 83 rotatably mounted in the lower end of member 82 and engaging the top surface of a T-shaped member 84.

Two blocks 85 and 86, positioned one above the other and immediately below T-shaped member 84, have a U-shaped groove extending throughout their length when engaging each other, this groove being thus shaped to receive a length of channeled wire 102, (Figure 4) the exact nature of which will be described more fully hereinafter. Preferably I provide springs (not illustrated) positioned between blocks 85 and 86 and tending to keep them apart. Thus, when pressure is applied to T-shaped member 84 and consequently block 86, this pressure acts against the springs to move these blocks together and, as the U-shaped channel running throughout their length is slightly smaller in dimensions than those of the channeled wire, lateral motion of this wire with respect to the blocks is prevented and the wire is thus gripped and held by blocks 85 and 86.

Blocks 85 and 86 are seated within and thus secured to a member 87 as more clearly shown in Figure 5. Member 87 is slidably mounted within ways 88 having inwardly extending walls engaging beveled walls thereof to interlock this member against vertical motion with respect to table 10 while permitting lateral motion as viewed in Figure 4.

A rod 89 (Figure 4) is secured to member 87 in any convenient manner as, for example, by threading the rod into the member and a right-angled projection 90 extending from the left-hand side frame 13 has slidably mounted therein the other end of rod 89. I may also provide stops 91 and 92, similar in construction and operation to stops 74 and 75 as more fully described above. Turning to Figure 3, I further provide a lever 93 through one end of which rod 89 passes, the latter having members 94 and 95 threaded thereon, for purposes of adjustment. Lever 93 is pivotally mounted to a member 96 extending from frame 13, and a spring 97 is connected to the rear end of this lever and to the side frame 13. Rotatably mounted in the lever 93 is a roller 98 engaging a side-faced cam 99 secured to shaft 12. Thus, upon the rotation of shaft 12, lever 93, due to actuation by cam 99, produces lateral motion in rod 89 and consequently member 87. Member 87 and blocks 85 and 86 may move in a right and left hand direction, as viewed in Figure 4, upon rotation of shaft 12. The contours of cams 79 and 99 are so arranged that member 82 (Figure 4) acts to impart pressure to block 86 simultaneously with the action of rod 89 to force member 87 and consequently blocks 85 and 86 in a right hand direction as viewed in the drawings. Thus, if channeled wire 102 is fed into the U-shaped recess between blocks 85 and 86, as long as member 82 is exerting pressure upon block 85, this wire is secured against any lateral motion with respect to the blocks and thus is pulled along with and by the blocks in a right hand direction as described above. However, when, due to the contour of cam 99, lever 93 and rod 89 act to pull member 87 in a left hand direction as viewed in Figure 4, the contour of cam 79 is such that pressure upon block 85 is released, this action being facilitated by a spring 81a seated between bolt 81 and the top of retaining guide box 28. Thus, the release of this pressure allows blocks 85 and 86 to move back to their normal position in a left hand direction, leaving channeled wire 102 in its new position. It will thus be seen that this channeled wire is given an intermittent motion in a right hand direction as viewed in Figure 4. By "channeled wire" I mean any suitable metallic wire having flanges upon and along its opposite sides, such as the flanges 116 and 117 better shown in Figure 7, a longitudinal section of this flat flanged wire 102 being shown in Fig. 6.

This channeled wire 102 I may form in any suitable way to give it the shape or characteristics just described, and by way of illustration, channeled wire 102 may be formed out of a flat metal strip 200 (see Figure 21). This strip 200 has its side edges bent up as, for example, by a roller 201 (Figure 22) having side flanges 202 and 203 with which coacts a roller 205 whose width is less than the distance between side flanges 202 and 203. Rollers 201 and 205 act up strip 200 to bend up the opposite edge portions of strip 200 to form the above-described flanges 116 and 117 and hence to form the channeled wire 102. Such means may, if desired, be associated with my machine, as for example, in a position to the left of block 85, as viewed in Figure 4, or it may operate independently of the machine.

Secured to table 10 in any convenient manner is a member 100, (Figures 3 and 4) the top of which is preferably in the same plane as the top of block 85 as best shown in Figure 4. This member extends forwardly above members 47 and 46 to a position immediately adjacent tool 35. Immediately above member 100 and substantially in engagement therewith is a block 101. A U-shaped groove (not illustrated) similar in shape and dimensions to the groove between blocks 85 and 86, is situated between member 100 and block 101. Thus, channeled wire 102 extending from blocks 85 and 86 may pass through this groove. Situated above block 101 is a block 103; a projection 104 of block 101 is in substantial registry with a member 105 slidably mounted within retaining guide box 28. Preferably a bolt 106 is threaded into member 105, and seated between the head of this bolt and the top of retaining box 28 is a spring 107 the pressure of which tends to keep member 105 in its upper position or, more specifically, out of engagement with projection 104. A bolt 108 is threaded through one end of a lever 109 (Figure 2) this bolt being in substantial registry with bolt 106. As more clearly illustrated in Figure 1, lever 109 is rotatably mounted upon shaft 18 and preferably has a roller 110 rotatably mounted within its opposite end in substantial engagement with a cam 111 mounted upon shaft 12. In this manner, the vertical motion given lever arm 109 by cam 111 when shaft 12 is rotated, is transmitted by member 105 to projection 104 of member 101. The contour of cam 111 is so shaped with respect to the contour of cam 79 that pressure is applied to block 101 only when the pressure is released from block 85. As described above, pressure is released from block 85 when this block and its connected parts is moving in a left hand direction. Thus the portion of channeled wire 102 moved by the right hand movement of blocks 85 and 86 is retained in its new position by block 101 and member 100. Furthermore, the contour of cam 111 is so shaped with respect to cam 21 operating tool 35 as described above that pressure is applied to block 101 to hold the channeled wire firmly when pressure is applied to tool 35 to actuate this tool in a downward direction so that it may perform its cutting function. In this manner, a piece of wire extending from the end of member 100 may be cut from the main portion thereof so that it drops substantially upon tool member 38a.

Extending from the top of right-angled members 49 and 50 (Figure 4) are two die members 112 and 113 respectively, better shown in Figure 6. These die members lie adjacent tool member 38a, as more clearly shown in Figure 6, and the opposite inner surfaces thereof are cut away so that the combination of these two members together with tool member 38a forms a substantially U-shaped recess generally indicated at 114. When member 46 (Figure 4) is in its normal position as described above, recess 114 is positioned immediately below the portion of channeled wire 102 extending from member 100 and block 101. Furthermore, this recess is in length substantially the same as the length of the projecting portion of channeled wire 102 when members 112 and 113 are in their open position due to the fact that no pressure is being exerted upon the bottoms of members 47 and 48 by T-shaped member 51 (Figure 4). Thus, as described above, when tool 35 cuts off the extending projecting portion of channeled wire 102, this cut-off piece of wire 115 falls upon tool member 38a and between die members 112 and 113 as more clearly shown in Figure 8. Cam 24 (Figure 1) is so shaped as to actuate tool 30 immediately following this cutting action and this tool now commences to move downwardly toward member 38a and between die members 112 and 113. However, simultaneously with this action, cam 56 actuates lever 53 (Figure 3) to force sleeve 52 and consequently T-shaped member 51 (Figure 4) upwardly thus moving die members 112 and 113 toward each other in the manner described above. Upon completion of this action, tool 30 comes into engagement with wire 115 as dies 112 and 113 substantially engage tool member 38a (Figure 10).

As more clearly shown in Figure 7, channeled wire 115 hereinabove referred to consists of a flat strip having upwardly extending flanges 116 and 117 at its opposite sides. When the wire is cut by tool 35 it falls upon tool member 38a and between die members 112 and 113 in the position shown in Figure 9, thus having its open ends facing die members 112 and 113 and its flanges 116 and 117 in the same plane as the front and rear sides of tool member 38a, as viewed in Figure 6. The bottom of member 30 has an extending portion 30a (Figure 9) of a width substantially equal to the distance between the inner sides of flanges 116 and 117 on wire 115. Furthermore, the length of portion 30a is slightly shorter than the bottom surface of recess 114 when die members 112 and 113 are in their closed position, but greater than the width of tool member 38a (Figure 10). Thus, as member 30a engages wire 115 and die members 112 and 113 assume their closed position, the opposite open ends 118 and 119 of the wire are bent upwardly as more clearly shown in Figure 10. In this manner I form wire 115 into a flat U-shape and, upon completion of this action due to the contour of cam 24 and spring 36, (Figure 4) tool 30 springs back to its normal position, but die members 112 and 113 remain in their closed position as shown in Figure 12.

Die members 112 and 113 together with tool member 38a holding wire 115 therein are now ready to be moved in a right hand and upward direction as viewed in Figure 4, for reasons to be described hereinafter. Thus, side faced cam 66 by means of lever 68 actuates rod 70 and consequently member 46 with its connected parts in a right hand direction and, simultaneously with this action, cam 64 actuates lever 60 (Figure 4) to move sleeve 58 in an upward direction. As sleeve 58 is an integral part of member 46, upward vertical motion is imparted to member 46 and its connected parts. Thus, member 46 and its connected parts and, more specifically, die members 112 and 113, tool member 38a and wire 115 assume an arc of motion to the right and upward as viewed in Figure 4. Sufficient latitude is left in the various connections between sleeve 58 and its inter-related parts together with their connected parts to allow for this motion. Thus, die members 112 and 113 and piece of wire 115 assume the "new" position referred to above.

This "new" position above referred to, places wire 115 substantially along side two coacting cutting or knife members 120 and 121 (Figures 1 and 13) and immediately beneath two separated dumb-bell heads 169a and 169b (Figure 13), all of which will be more clearly described hereinafter. Accordingly, in this "new" position heads 169a and 169b lie between flanges 116 and 117 of wire 115, as is more clearly shown in Figure 15.

Preferably I obtain such dumb-bell links from wire hammered or otherwise shaped in dumb-bell form; as more clearly shown in Figure 13, this wire 122 consists of successive dumb-bell portions having their opposite ends or heads adjoining and connected to each other. Hence, if this wire is cut between these heads, individual dumb-bell links are provided. The knives 120 and 121 achieve such cutting. It should be understood that the exact shape of this wire is immaterial to a thorough and efficient operation of certain features of my invention so long as the wire consists of continuous portions having heads which are larger than their main bodies and adjoining and connected to each other so that upon being cut into individual links, they form links having a larger diameter at their opposite ends than at a point substantially near their center. For convenience, this wire will be hereinafter referred to as "dumb-bell wire", this being a preferred and convenient form of wire easily adaptable and suited to the purposes and operation of a preferred form of this machine.

Turning to Figure 2, I have shown a supporting device 123 secured to table 10 in any convenient manner and positioned to the left of member 46. As more clearly shown in Figure 13, a channel 124 is formed in the top of supporting device 123, this channel being substantially at right angles to the path of movement of member 46. A member 125 is slidably mounted within channel 124 so that it may move toward and away from member 46. For purposes of convenience, the direction of motion of member 125 with respect to device 123 toward member 46 will be referred to as "rearward", and an opposite direction thereof, will be termed "forward". A supporting member 126 is secured to or integral with device 123 at the opposite sides of channel 124 so that it extends across the channel as viewed in Figure 13. Extending through member 126 in a direction substantially parallel to the plane of the top of device 123, is a hole 127 and suitably positioned adjacent this hole is a pawl 128 spring pressed in any suitable manner as, for example, by a spring 129 in a direction toward the axis of the hole. Thus, dumb-bell wire 122 may be passed through hole 127, and pawl 128 by its interengagement with the various heads upon the dumb-bell wire, acts to permit relative movement of the wire with respect to member 126 in a direction toward knives 120 and 121 while preventing movement in the opposite or forward direction.

As best shown in Figures 2 and 13, a member 130 extends upwardly near the central rearward portion of device 125 and preferably is an integral part thereof. Extending substantially through the center of member 130 is a hole 131 in substantial registry with hole 127 in member 126, and suitably positioned within member 130 is a pawl 132 substantially adjacent hole 131 and spring pressed toward the axis of this hole in any desired manner as by a spring 133. Thus, dumb-bell wire 122 extending from hole 127 may be threaded through hole 131 in member 130 past pawl 132. Pawl 132, as shown in Figure 13, allows relative motion of dumb-bell wire 122 with respect to member 130 in a direction toward knives 120 and 121 while preventing any motion forwardly due to the interengagement between pawl 132 and the respective heads previously formed upon the wire.

Two jaws 134 and 135 carrying knives 120 and 121 respectively are pivotally mounted upon the upper surface of member 125 as by means of screws 136 and 137 preferably threaded into member 125 and are connected at their opposite ends preferably by a spring 138, this spring acting to keep knives 120 and 121 apart. The ends 139 and 140 of jaws 134 and 135 adjacent spring 138 are preferably beveled inwardly or, more specifically, in a direction substantially toward hole 131 in member 130 and in planes substantially perpendicular to the top of device 123.

Slidably mounted within member 125 and in front of member 130, (Figure 13) is a T-shaped member generally indicated at 141 having a portion 142 extending outwardly from the front of member 125 or, more specifically, at that end opposite member 130. The rear end of T-shaped member 141 is beveled inwardly to form two surfaces 143 and 144, these beveled surfaces being in substantial registry and lying adjacent the forward ends of jaws 134 and 135. Thus member 141 is adapted to perform a cam-like function when moved rearwardly to engage ends 139 and 140 of jaws 134 and 135, and upon the continuation of this movement, these ends move apart to pivot about screws 136 and 137 against the action of spring 138 to force knives 120 and 121 toward each other.

A spring 145 is secured to device 123 and member 125 at points 146 and 147 on these respective parts, the tension of which acts against the rearward movement of member 125 with respect to device 123. Threaded into an extended portion 148 of member 125, and positioned in front of supporting member 126, is a bolt 149 having its free end 150 extending toward member 126. This bolt acts as a stopping means to prevent member 125 from moving beyond a certain point upon device 123 within guiding channel 124 thereof, the exact point at which this stopping action takes place being adjustable by determining the length of the end 150 of bolt 149.

It will now become clear that member 125 and its various connected parts may move in a rearward direction with respect to device 123, and the extent and character of this motion is preferably controlled by a lever 151 (Figure 2) pivotally mounted preferably within integral portions extending from the front of device 123. End 152 of lever 151 is in substantial registry with member 125, and preferably I provide a bolt 153 threaded therethrough and adapted to engage member 125, as more clearly shown in Figure 13. The other end 154 of lever 151 is in substantial registry with a plane parallel with but below the bottom of table 10, thus to engage one end of a rod 155 slidably mounted upon the bottom of the table. Rod 155 extends rearwardly from a point substantially adjacent end 154 of lever 151 to the opposite side of table 10, where it is in substantial registry with one end 156 of a lever 157 (Figure 2), this lever being pivotally mounted in any suitable manner preferably on an axis to the rear and below the axis of shaft 12. Rotatably mounted on the other end 158 of lever 157 is a roller 159 adapted to engage a cam 160 secured to shaft 12, as more clearly shown in Figure 4. Turning back to Figure 1, it will be seen that upon rotation of shaft 12, the lateral motion created by the contour of cam 160 is transmitted to lever 157 and thus to rod 155 which in turn transmits this motion to lever 151 to create a corresponding motion in member 125.

As pointed out above, T-shaped member 141 (Figure 13) may move relative to member 125, and this action may be controlled by pressure applied to portion 142 thereof. Thus one end 161 of a lever 162 is in substantial registry with portion 142 of member 141 and preferably I provide a bolt 163 threaded therethrough and positioned adjacent portion 142 (Figure 13). Lever 162 is pivotally mounted to the forwardly extending portions of device 123 in a manner substantially similar to that described with respect to lever 151, and the other end 164 thereof is positioned adjacent the end of a rod 165 Figure 1), this rod being in substantially the same plane and substantially parallel to rod 155 and similarly slidably mounted in the bottom of table 10. The opposite end of rod 165 is in registry with one end of a lever 166, similar in construction and axial position to lever 157, thus preferably having rotatably mounted on its opposite end a roller 167 in engagement with a cam 168 on shaft 12. The rotation of shaft 12 creates lateral motion in lever 166 and consequently moves rod 165 to actuate lever 162 and thus impart lateral motion to T-shaped member 141, the character of this motion being dependent upon the contour of cam 167 and independent of any action of member 125.

In this manner, I provide for the lateral motion of T-shaped member 141 and member 125 each independently of the other. However, it should be noted that the motion of these two parts is controlled by different cams, namely, cam 160 and cam 168, thus insuring a proper relative motion of these parts with respect to each other in a manner to be more specifically described hereinafter.

If dumb-bell wire 122 is threaded through hole 127 of member 126, as will be more clearly understood from Figures 13 and 14, and thence through hole 131 of member 130 so that a portion thereof extends from the rearward end thereof and so that its end head 169b substantially adjoins 169a of a free link, this feeding and cutting mechanism is ready for operation. The contour of cam 160 (Figure 1) is such that, upon the rotation of shaft 12, this cam acts to move member 125 rearwardly before cam 168 (Figure 4) exerts any pressure, in the manner described above, upon portion 142 of T-shaped member 141. This rearward motion of member 125 and its connected parts, which include member 130 and jaws 134 and 135 all connected thereto, pulls wire 122 rearward, for pawl 132 does not allow any forward motion of this wire with respect to member 130. During this first rearward motion of member 125, therefore, pawl 128, mounted within member 126, snaps over two adjoining and connected heads of the wire and by the time this motion of member 125 has ceased, due to the contour of cam 160 and the action of stop 150, wire 122 has moved rearward with respect to supporting member 126 a distance equal to the length of one of the dumb-bell links included therein.

As the parts assume this new position, they have been so adjusted that the opposite edges of knives 120 and 121 are in substantial registry with a point upon wire 122 between two adjoining and connected heads. If, now knives 120 and 121 are closed, the wire having been moved rearwardly as above described, the wire will be cut to form an individual dumb-bell link 169. Accordingly, simultaneously with the rearward movement of member 125, cam 168 has acted to move end 161 of lever 162 rearward in the manner described above, and the speed of this action increases at this time so that bolt 163 overtakes portion 142 of T-shaped member 141 during the course of its rearward movement or, at the conclusion thereof, to exert pressure thereon. Thus, T-shaped member 141 is moved rearwardly with respect to member 125 and cam surfaces 143 and 144 engage ends 139 and 140 respectively of jaws 134 and 135. Continued pressure by bolt 163 causes jaws 134 and 135 to move about their axes, thus closing knives 120 and 121 between the adjoining and connected heads of two dumb-bell portions of wire 122 to sever this connection, as more clearly shown in Figure 14. Pressure is released by lever 162 on portion 142 of T-shaped member 141 preferably immediately after this cutting action and preferably while member 125 still remains in its rearward position, thus causing cam surfaces 143 and 144 to move out of engagement with ends 139 and 140 of levers 134 and 135. Spring 138 now acts to pull these ends of the jaws together, thus causing knives 120 and 121 to spring apart. Next, due to the contour of cam 160, lever 151 release its pressure upon member 125 and spring 145 thus acts to return member 125 forwardly to its normal position. As member 125 moves forwardly to return to its normal position, pawl 132 snaps over two adjoining and connected heads of wire 122, for this wire is kept in its rearward position due to the action of pawl 128 as described above. The parts are now in position for the next feeding and cutting action which takes place in a manner similar to that described above.

In substantial registry with hole 131 of member 130 and sufficiently spaced in front thereof, is a hole 170 (Figures 13 and 14) extending through and positioned substantially between two semi-cylinder-like members 171 and 172, as more clearly shown in Figure 2. These members may be mounted in any convenient manner in this position on bed 10 and preferably springs 173 and 174 (Figure 3) are seated therein, the pressure of which tends to push members 171 and 172 away from each other and thus to enlarge the hole 170. An upwardly extending portion 175 of member 172 (Figure 2) is in substantial registry with an end 176 of a lever 177 rotatably mounted upon shaft 18. Rotatably mounted on the opposite end of lever 177 is a roller 178 in substantial engagement with a cam 179 secured to shaft 12. Thus, rotation of shaft 12 produces vertical motion in lever 177, the character of which is dependent upon cam 179, and end 176 of the lever thus exerts a pressure upon member 172 against the action of springs 173 and 174 corresponding to the character of this motion. Thus members 171 and 172 may be brought closer together to contract the hole 170 to grip certain parts as is described in detail below.

Preferably before member 125 has commenced its forward motion to culminate in the cutting action of knives 120 and 121, member 46 carrying with it die members 112 and 113 containing channeled wire 115 as shown in Figure 12, has moved over to the "new" position described above and this "new" position is substantially adjacent hole 170 in members 171 and 172, as more clearly shown in Figure 15. Thus, as shown in Figures 13 and 15, the bottom of wire 115, held between die members 112 and 113 (Figure 19), is substantially parallel and in a plane with the bottom of hole 170 at this time, these members having moved from the position shown in Figure 12. Furthermore, flanges 116 and 117 are substantially at right angles to the axes of holes 170 and 131 (Figure 15). Member 46 remaining substantially in this position for the moment, wire 115 is so located that it may be wrapped in cylinder fashion about head 169a protruding from cylinder link 115b (Figure 13) and end head 169b, all before the rearward motion of member 125 commences.

Turning to Figure 4, cam 45 upon shaft 12 now presents to roller 44 such a portion of its surface that rod 41, under the action of spring 39a (Figure 2) and by way of lever 39, pulls rod 38 in a downward direction, thus causing tool member 38a to move out of registry with the opposing sides of die members 112 and 113. Simultaneously with this action, cam 56 on shaft 12 (Figure 3) swings lever 53 in clockwise direction as viewd in Figure 2, thus causing T-shaped member 51 (Figures 2 and 4) to move upwardly and move members 47 and 48 closer together and a sufficient distance to bring die members 112 and 113 into substantial engagement; this relation of dies 112 and 113 is shown in Figure 20. This action bends wire 115, up to this point shaped, as in Figures 12 and 19, into a substantially cylindrical form as is indicated at 115a, in Figures 16 and 20, this cylinder having inwardly extending annular flanges 116a and 117a at its opposite ends. One head 169b of wire 122 is thus enclosed by and retained within this cylinder-like member, for the inside diameter of these annular flanges is smaller than the diameter of the heads upon dumb-bell wire 122, all of which is more clearly shown in Figure 16.

Immediately after the parts have assumed the above-described positions shown in Figure 16, member 46 carrying die members 112 and 113 starts to move downwardly and to the left, as viewed in Figure 4. Simultaneously with this action, member 125 (Figure 13) starts its rearward movement, as more fully described above, and as head 169b forming the end of wire 122 (Figure 16) is held in alignment with head 169a by cylinder link 115a, such forward movement of the wire with member 125 moves link 115a toward hole 170. Hole 170 has been sufficiently enlarged so that link 115a may make its entrance due to the action of springs 173 and 174 which tend to force member 172 (Figure 2) away from member 171. Finally, the rearward movement of wire 122 and member 130 is of sufficient length so that substantially one half of cylinder link 115a lies within hole 170, as more clearly shown in Figure 17. Substantially at this moment, two actions occur:—

Cam 179 together with lever 177 moves member 172 toward member 171 (Figure 2) against the action of springs 173 and 174 to contract hole 170 about links 115a and 115b thereby holding them in this new position.

As more clearly shown in Figure 14, T-shaped member 141 has moved to its forward position, described above, to force knives 120 and 121 toward each other between heads 169c and 169d thereby severing another dumb-bell link 169 (Figures 14 and 17) from wire 122. At the instant of the completion of this cutting action a new cylinder link 115a and dumb-bell link 169 has been added to the chain 200 (Figure 2).

Member 125 together with its connected parts including member 130 and knives 120 and 121, now starts its forward movement under the impetus of spring 145 (Figure 14). Wire 122, however, is held in its forward position by pawl 128 (Figure 14). During this forward movement of member 125, member 46 together with die members 112 and 113 has assumed its normal position and the operative steps shown in Figures 6–12 have taken place. As knives 120 and 121 together with member 125 reach their forward position, shown in Figure 18, die member 46 has again moved to its "new" position with a new channel wire 115. It will now be seen that the parts have returned to substantially the same position shown in Figure 15, die members 112 and 113 holding a new channel link 115c immediately beneath heads 169c and 169d and the wrapping action will take place shortly to culminate in another repetition of the operative steps described above.

In view of the foregoing, the construction and action of my machine and the carrying out of the various steps of my process will, it is believed, now be clear, but by way of general résumé, it might at this point be noted that to place the machine in condition for operation I first thread a piece of channeled wire 102 through the U-shaped channel between blocks 85 and 86 (Figure 5) and thence through the U-shaped channel lying between member 100 and block 101, (Figure 4) so that a portion thereof of the preferred length as described above extends from the right hand end thereof, as viewed in Figures 4 and 6. Next, I thread a piece of dumb-bell wire 122, the character of which has been described above, through hole 127 in member 126 (Figure 13) and through hole 131 in member 130 so that a sufficient length thereof extends beyond knives 120 and 121 (Figure 13). Then, to start operation, power is applied to rotate shaft 12 in any convenient manner and the operation of the machine commences. Tool 35 (Figures 4 and 6) moves downwardly, as best shown in Figure 4, to cut piece of wire 115, this piece of wire falling upon tool member 38a and between die members 112 and 113 (Figure 8). Next, tool 30 moves down (Figure 8) and comes in contact with piece of wire 115 as dies 112 and 113 move inwardly until the parts assume the position shown in Figure 10. As tool 30 moves upwardly, leaving channeled wire with two upwardly extending open ends 118 and 119 as shown in Figure 12, member 46 moves to the right and upwardly (Figure 4) to its "new" position due to the action of cam 66 and cam 64, as best shown in Figure 4.

Die members 112 and 113 now occupy a position such as that shown in Figures 15 and 19, thus head 169a lies within flanges 116 and 117 of channeled wire 115, as does head 169b of wire 122; tool member 38a now moves downwardly out of registry with the opposing sides of die members 112 and 113. Die members 112 and 113 next move together to form cylinder link 115a and member 125 (Figure 13) moves rearwardly thereafter. The rearward movement of member 125 pushes cylinder link 115a substantially half way into hole 170 and also moves cylinder link 115b a corresponding distance further therein, this hole being of sufficient diameter for such reception due to the fact that lever 177 (Figure 2) is exerting no pressure upon member 172 and the latter is separated sufficiently from member 171. As cylinder link 115a comes to rest in this new position, (Figure 17) pressure is applied to member 172 moving it toward member 171 and link 115a is thus held firmly therebetween in this position. Substantially at the completion of this movement, knives 120 and 121 move together to sever wire 122 between head 169c (extending from cylinder link 115a) and head 169d (Figure 17). During this last action, or shortly thereafter, member 46 has moved downwardly and to the left to assume its normal position as shown in Figure 4. Also, as member 46 moves to the left, as viewed in Figure 4, member 125 together with knives 120 and 121 starts its forward movement and finally reaches the position shown in Figure 18. However, before member 46 has assumed its normal position, blocks 85 and 86 have moved to the right so that another length of channeled wire has been moved to the right to extend beyond the right hand end of member 100, as best shown in Figures 4, 5 and 6. Now the action of tools 35 and 30 (Figures 6-12) is repeated so that member 46 next moves to the right to assume its "new" position with channeled wire 115. As this movement of member 46 is taking place, member 125 and member 130 (Figure 18) have come to rest in their forward position. Soon member 125 with knives 120 and 121 will start its rearward movement to culminate in the above-described cutting action. Thus the action continues as described above and it will be seen that by the continuation of these steps and operations, a chain is formed consisting of individual dumb-bell links having their heads retained by inwardly extending annular flanges upon the opposite ends of cylinder links.

Such a chain as is thus formed by this machine and according to my process in a thoroughly practical and economical manner has a variety of uses and it will be seen that its simple construction and the inexpensive nature of materials from which it is made, all combine to make it an extremely desirable product. The method by which I achieve this result is thoroughly practical for the reason that it reduces the necessary labor and at the same time permits high speed of production of chain.

It will thus be seen that I have provided a thoroughly practical and reliable machine and method in which the several objects of my invention as well as many thoroughly practical advantages are successfully achieved.

Where, in certain of the following claims, the term "piece of channeled wire" is employed without reference elsewhere in the claim to the channeled wire itself, I wish it to be understood that I thereby intend also to define and include a part having the characteristics of a part like that referred to in the specification and indicated in the drawings by the reference character 115 (Figures 7 and 8) with flanges on the order of the flanges 116 and 117 (Figure 7) without regard to whether this piece is made of "wire" or not.

As many possible embodiments may be made of the above invention and as the art herein described might be varied in various parts, all without departing from the scope of the invention, it is to be understood that all matter hereinabove set forth or shown in the accompanying drawings is to be interpreted as illustrative and not in a limiting sense.

I claim:

1. In a device of the character described, in combination, means for disposing pairs of dumb-bell links in registry with successive pieces of channeled wire so that one head of each dumb-bell link lies inside one of the flanges of said channeled wire, one of said links being a portion of a dumb-bell wire, means for bending the ends of said pieces of channeled wire around adjoining heads of each of said pairs of dumb-bell links to form a substantially cylindrical link having inwardly extending annular flanges at its opposite ends for retaining said dumb-bell links, means for severing said one dumb-bell link from said dumb-bell wire, and means for repositioning said cylindrical link so that the head of said one dumb-bell link extending therefrom lies within the flange of the next portion of channeled wire.

2. In a device of the character described, in combination, means for cutting individual pieces of channeled wire, means for receiving each piece of channeled wire, said receiving means adapted to transfer said piece of channeled wire to a new position, means for disposing dumb-bell links on said piece of channeled wire so that one head of each dumb-bell link lies inside one of the flanges of said piece of channeled wire, one of said dumb-bell links being a portion of a dumb-bell wire, means for closing the end of said pieces of channeled wire about adjoining heads of successive portions of dumb-bell links to form a substantially cylindrical link for retaining said pair therein, and means for severing said one dumb-bell link from said dumb-bell wire and repositioning said cylinder link so that a head of said last-mentioned dumb-bell link is in registry with the next piece of channeled wire in its new position.

3. In a device of the character described, in combination, means for cutting individual pieces of channeled wire, means for receiving pieces of channeled wire, means for bending the open ends of said channeled wire upwardly, said bending means and said receiving means adapted to transfer each piece of channeled wire to a new position beneath dumb-bell links so that one head of each dumb-bell link lies inside one of the flanges of each piece of channeled wire, one of said dumb-bell links being a portion of a dumb-bell wire, means for closing the open end of each piece of channeled wire about said heads of said dumb-bell links to form a substantially cylindrical link for retaining said links therein, means for severing said one dumb-bell link from said dumb-bell wire and repositioning said cylinder link so that a head of said dumb-bell link is in registry with the next piece of channeled wire when in said new position, and means for feeding said channeled wire to said cutting means.

4. In a device of the character described, in combination, means for receiving pieces of channeled wire, members coacting with said receiving means for bending the end portions of said pieces of channeled wire upwardly, means for disposing dumb-bell links in registry with said pieces of channeled wire, one of said links being a portion of a dumb-bell wire, means for closing the ends of said pieces of channeled wire around pairs of adjoining heads of said dumb-bell links, and means for severing said one dumb-bell link from said dumb-bell wire.

5. In a device of the character described, in combination, means for receiving pieces of channeled wire, members coacting with said receiving means for turning the open ends of each piece of channeled wire upwardly, means for disposing adjoining heads of pairs of dumb-bell links within the flanges of said pieces of channeled wire, and means for closing the ends of said pieces of channeled wire about said heads of said pairs of dumb-bell links to retain said links against endwise displacement therefrom.

6. In a device of the character described, in combination, means for receiving pieces of channeled wire, members coacting with said receiving means for turning the open ends of each piece of channeled wire in a direction substantially at right angles to the remaining portion thereof, means for disposing adjoining heads of pairs of dumb-bell links within the flanges of each piece of channeled wire, means for closing the ends of each piece of channeled wire about said heads of two of said dumb-bell links to form cylindrical links, and means for severing one of said links from a dumb-bell wire and repositioning said cylindrical links so that a head of said last mentioned dumb-bell link adjoins the end head of said dumb-bell wire within the next piece of channeled wire.

7. In a device of the character described, in combination, means for receiving pieces of channeled wire, means coacting with said receiving means for bending the open ends of each piece of said channeled wire upwardly, means for disposing the adjoining ends of pairs of dumb-bell links within the flanges of each of said pieces of channeled wire, means for closing the ends of each of said pieces of channeled wire about said heads of said pairs of dumb-bell links to form cylindrical links, and means for repositioning each of said cylinder links so that the head of a dumb-bell link extending therefrom lies within a flange of the next succeeding piece of channeled wire.

8. In a device of the character described, in combination, means for cutting individual pieces of channeled wire, means for receiving each piece of channeled wire, means for disposing the adjoining ends of pairs of dumb-bell links within the flanges of each of said pieces of channeled wire, means for closing the open ends of said pieces of channeled wire about said heads of two of said dumb-bell links to form cylinder links, means for repositioning each of said cylinder links so that the head of a dumb-bell link extending therefrom lies within a flange of the next succeeding piece of channeled wire, and means for feeding said channeled wire to said cutting means.

9. In a device of the character described, in combination, means for supporting pieces of channeled wire, members coacting with said supporting means for bending the end portions of each of said pieces of channeled wire substantially at right angles to the remaining portion thereof, means for transporting each piece of channeled wire to a new position beneath the adjoining heads of dumb-bell links and said heads being within the flanges of each of said pieces of channeled wire, means for closing the ends of each piece of said channeled wire about said heads of two of said dumb-bell links so that said flanges are adapted to retain said dumb-bell links to form a cylinder link, and means for repositioning each of said cylinder links so that a head of one of said dumb-bell links extends therefrom and is in registry with the inner portion of the next piece of channeled wire, as said next piece of channeled wire assumes its new position.

10. In a device of the character described, in combination, means for cutting individual pieces of channeled wire, means for receiving and supporting each piece of said channeled wire from said cutting means, means for transferring each piece of channeled wire to a new position in registry with the adjoining heads of pairs of dumb-bell links, means for closing the ends of each piece of channeled wire around the heads of successive pairs of said dumb-bell links to form a substantially cylindrical link having inwardly extending annular flanges at its opposite ends within which lie said heads, means for repositioning each of said cylindrical links so that a head of one of said dumb-bell links extending therefrom is in registry with the next piece of channeled wire as it assumes its new position, and means for feeding channeled wire to said cutting means.

11. In a device of the character described, in combination, means for receiving pieces of channeled wire, members positioned adjacent said receiving means for supporting said pieces of wire thereon, means coacting with said supporting means for bending the open ends of said pieces of channeled wire substantially at right angles to the main portion thereof, means for disposing the ends of dumb-bell links on said pieces of channeled wire, means for closing the open ends of said pieces of channeled wire about said ends of said dumb-bell links to form substantially cylindrical links having inwardly extending flanges, and means for severing one of said dumb-bell links from a dumb-bell wire.

12. In a device of the character described, in combination, means for receiving pieces of channeled wire, members positioned adjacent said receiving means for supporting each of said pieces of wire thereon, means coacting with said supporting means for bending the open ends of said piece of wire substantially upwardly, means for disposing the adjoining heads of pairs of dumb-bell members within the flanges of said piece of channeled wire, and means for closing the open ends of said channeled wire about said heads of said pairs of dumb-bell members to hold them therein.

13. In a device of the character described, in combination, means for receiving pieces of channeled wire, members positioned adjacent said receiving means for supporting each piece of wire thereon, said means and said members acting to transport each piece of wire to a new position, means for placing the adjoining heads of successive pairs of dumb-bell links within the flanges of each of said pieces of channeled wire, one of said links still being a part of a dumb-bell wire, means for closing said open ends of each of said pieces of channeled wire about said heads of said pairs of dumb-bell links to form cylindrical links, and means for severing said one dumb-bell link from said dumb-bell wire and repositioning each of said cylindrical links so that the head of one dumb-bell link extending therefrom is in substantial registry with the inner portion of the next piece of channeled wire when said next piece of channeled wire assumes said new position.

14. In a device of the character described, in combination, means for cutting individual pieces of channeled wire, means for receiving each piece of said channeled wire, members positioned adjacent said receiving means for supporting said pieces of wire thereon, means coacting with said receiving means for bending the ends of said pieces of channeled wire upwardly, all of said means and said members acting to transport each of said pieces of wire to a new position beneath the adjoining heads of pairs of dumb-bell links and within the flanges of said piece of channeled wire, one of said dumb-bell links being a portion of a dumb-bell wire, means for closing said ends of said pieces of channeled wire about said heads of said pairs of dumb-bell links to form cylindrical links to retain said dumb-bell links against endwise displacement therefrom, means for severing said one dumb-bell link from said wire and repositioning each of said cylindrical links so that the head of one dumb-bell link extending therefrom is in substantial registry with the inner portion of the next piece of channeled wire when said next piece of channeled wire assumes its new position, and means for feeding channeled wire to said cutting means.

15. In a device of the character described, in combination, means for cutting individual pieces of channeled wire, means for receiving a cut-off piece of said channeled wire, means coacting with said receiving means for supporting said piece of wire thereon and bending the end portions thereof upwardly with respect to the main portion of said piece of channeled wire, means for placing the adjoining heads of pairs of dumb-bell links within the flanges of said pieces of channeled wire so that portions of each of said links forming said pairs extend from the opposite ends thereof while one of said links is still a part of a dumb-bell wire, means for closing the ends of said piece of channeled wire around said adjoining heads of said pairs of dumb-bell links to form a substantially cylindrical link for retaining said dumb-bell links against endwise displacement, means for repositioning said cylindrical links so that one of said portions of one of said dumb-bell links lies in substantial registry with the next piece of channeled wire, means for severing said one link from said wire, and means for feeding channeled wire to said cutting means.

16. In a device of the character described, in combination, means for cutting individual pieces of channeled wire, means for receiving each piece of channeled wire, members positioned adjacent said receiving means for supporting each piece of wire thereon, said members coacting with said supporting means for bending the ends of each piece of channeled wire upwardly, means for transferring each piece of wire to a new position beneath the free head of a dumb-bell link and adjoining the end head of a dumb-bell wire, means for bending the ends of each piece of channeled wire around two of said adjoining heads to form a substantially cylindrical link having inwardly extending annular flanges at its opposite ends within which lie said adjoining heads, means for successively severing the portions of said dumb-bell wire including said end heads, means for repositioning each of said cylindrical links so that one head of one dumb-bell link extending therefrom lies in registry with that portion of the next piece of channeled wire inside of the flanges thereof as said next piece of channeled wire assumes said new position, and means for feeding said channeled wire to said cutting means.

17. In a device of the character described, in combination, means for receiving pieces of channeled wire, means for bending the ends of each piece of said channeled wire upwardly, means for closing said ends of each of said pieces of channeled wire about one head of successive dumb-bell links and the end head of a dumb-bell wire to retain said heads against endwise displacement and means for severing dumb-bell links from said wire including said end heads successively.

18. In a device of the character described, in combination, means for cutting individual pieces of channeled wire, means for receiving each piece of said channeled wire, means for transporting each piece of channeled wire to a new position beneath the head of a dumb-bell link and the end head of a dumb-bell wire, means for closing the ends of each of said pieces of channeled wire about two of said heads to form cylindrical links, means for severing a dumb-bell link from a dumb-bell wire, said link including said end head, means for repositioning each of said cylindrical links so that the next piece of channeled wire lies adjacent a portion of a dumb-bell link extending from the last-formed cylindrical link when said next piece of channeled wire assumes said new position, means for feeding channeled wire to said first-mentioned cutting means, and means for feeding said dumb-bell wire to said severing means.

19. In a device of the character described, in combination, means for cutting individual pieces of channeled wire, means for receiving each piece of channeled wire, means for bending the ends of each piece of channeled wire upwardly, means for transporting each piece of channeled wire to a new position beneath the free end of a dumb-bell link and the end head of a dumb-bell wire, means for closing said ends of each piece of channeled wire about said heads to form cylindrical links to retain two dumb-bell links against endwise displacement therefrom, and means for repositioning each of said cylindrical links so formed so that each dumb-bell link extending therefrom lies in substantial registry with the next piece of channeled wire when said piece of channeled wire assumes said new position.

20. In a device of the character described, in combination, means for cutting individual pieces of channeled wire, members adapted to receive said pieces of channeled wire and transport them to a new position in registry with one head of a dumb-bell link and the end head of a dumb-bell wire means for bending said pieces of channeled wire about two of said heads of successive pairs of said dumb-bell links, and means for severing a dumb-bell link from said wire, said link including said end head.

21. In a device of the character described, in combination, means adapted to cut individual pieces of channeled wire, means for receiving pieces of said channeled wire, members positioned adjacent said receiving means for supporting each of said pieces of wire thereon, means coacting with said supporting means for bending the open end of each of said pieces of channeled wire upwardly, said supporting means adapted to move into a position in registry with the head of a dumb-bell link and the end head of a dumb-bell wire, and means for closing the open ends of each of said pieces of channeled wire about two of said heads to retain said heads against endwise displacement therefrom.

22. In a device of the character described, in combination, means adapted to cut individual pieces of channeled wire, means for receiving each piece of said channeled wire, members positioned adjacent said receiving means for supporting each piece of wire thereon, means coacting with said supporting means for bending the open ends of each piece of channeled wire upwardly, means for transferring said supporting means for each piece of channeled wire to a new position in registry with the heads of a dumb-bell link and the end head of a dumb-bell wire, means for closing the open ends of each piece of channeled wire about two of said heads to form a substantially cylindrical link, means for severing a dumb-bell link including said end head from said dumb-bell wire, and means for repositioning said cylindrical link so that a portion of said last-mentioned dumb-bell link extending therefrom is in substantial registry with the next succeeding piece of channeled wire as it assumes its new position.

23. In a device of the character described, in combination, means adapted to cut individual pieces of channeled wire, means for receiving each piece of said channeled wire, members positioned adjacent said receiving means for supporting each piece of wire thereon, means coacting with said supporting means for bending the ends of each piece of channeled wire upwardly, means for transferring each piece of channeled wire to a new position beneath the adjoining heads of a dumb-bell link and the end head of a dumb-bell wire, means for closing the ends of each of said pieces of channeled wire about both of said heads to form a substantially cylindrical link, means for repositioning said cylindrical link, means for severing a dumb-bell link including said end head from said dumb-bell wire so that a portion of a dumb-bell link extending therefrom is in substantial registry with the next piece of channeled wire as it assumes its new position, means for feeding channeled wire to said cutting means, and means for feeding dumb-bell wire to said severing means.

24. The herein described art which consists in disposing dumb-bell links in registry with pieces of channeled wire so that the adjoining heads of said links lie within the flanges of said pieces of channeled wire, and bending the pieces of channeled wire into cylindrical form about the adjoining heads of said dumb-bell links.

25. The herein described art which consists in cutting channeled wire into pieces, disposing dumb-bell links in registry with said pieces of channeled wire so that the adjoining heads of two of said dumb-bell links lie within the flanges of each of said pieces of channeled wire, and closing the ends of said pieces of channeled wire about said heads of said dumb-bell links.

26. The herein described art which consists in bending the ends of pieces of channeled wire substantially at right angles to the main portion thereof, disposing dumb-bell links in registry with pieces of said channeled wire so that adjoining heads of said dumb-bell links lie within the flanges of each piece of said channeled wire, and closing the open ends of said channeled wire about said heads of said dumb-bell links.

27. The herein described art which consists in cutting channeled wire into individual pieces, bending the ends upwardly, disposing heads of dumb-bell links and end heads of dumb-bell wire in alignment within the flanges of each piece of channeled wire, and closing the ends of said pieces of channeled wire about said heads.

28. The herein described art which consists in bending the open ends of pieces of channeled wire substantially at right angles to the main portion thereof, cutting dumb-bell wire into individual dumb-bell links, disposing one of said dumb-bell links in substantial registry with each piece of channeled wire and in alignment with the end of said wire so that one head of the link and the end of said dumb-bell wire lie within the flanges of the channeled wire, and closing the open ends of said channeled wire about said heads.

29. The herein described art which consists in cutting individual dumb-bell links from dumb-bell wire, placing pairs of dumb-bell links in registry with pieces of channeled wire so that the heads of said dumb-bell links and the end head of said dumb-bell wire lie within the flanges of said pieces of channeled wire, closing the open ends of said channeled wire about said adjoining heads of said dumb-bell links, and severing the next dumb-bell link from said dumb-bell wire.

30. The herein described art which consists in forming a piece of metal with flanges at its sides, bending the ends of said piece of metal upwardly, and wrapping said bent piece of flanged metal in cylinder fashion about the enlarged portions of a dumb-bell link member and a piece of dumb-bell wire.

31. In a device of the character described, in combination, means forming a sheet-like piece of metal with a flange at a side edge thereof, and means for wrapping said piece of metal about the enlarged portion of a link member with said flange enveloping a narrower portion of said link member.

32. In a device of the character described, in combination, means forming a sheet-like piece of metal with flanges extending substantially at right angles to the main body thereof upon two sides thereof, means adapted to relate a headed link member to said piece of metal with the head of the former extending intermediate one of said flanges, and means for wrapping said piece of metal about the head of said link member.

33. In a device of the character described, in combination, means forming a sheet-like piece of metal with flanges upon two sides thereof, means adapted to relate a headed link member to said piece of metal with the head of the former extending intermediate one of said flanges, and die-forming means adapted to act upon said piece of metal for causing the latter to envelop said head so that said flanges extend inwardly from the main body thereof.

34. In a device of the character described, in combination, means forming a sheet-like piece of metal with flanges upon two sides thereof, means partially bending said piece of metal in the planes of said flanges, means adapted to relate a headed link member to said piece of metal with the head of the former lying within said flanges, said flanges extending toward said link member, and means for completing the bending of said piece of metal to wrap it about said head.

35. In a device of the character described, in combination, means forming a sheet-like piece of metal with flanges upon two sides thereof, means partially bending said piece of metal in the planes of said flanges, means for relating adjoining heads of link members within said flanges of said piece of metal, and means for completing the bending of said piece of metal and wrapping it around said head so that said flanges extend inwardly substantially toward said link members.

36. In a device of the character described, in combination, means adapted to form pieces of channeled wire, means for disposing successively each of said pieces in registry with the free end of a dumb-bell link and the end head of a dumb-bell wire, means for wrapping each of said pieces of channeled wire about the head of said dumb-bell link and the end head of said wire so that said heads are imprisoned within the channel of said piece of wire, and means for severing the end link of said dumb-bell from said wire.

37. In apparatus for forming a chain comprising dumb-bell links having their opposite ends imprisoned within cylindrical links, in combination, means for forming a piece of channeled wire, means for disposing said piece of channeled wire substantially beneath the free head of a dumb-bell link the other end of which is imprisoned in a previously formed cylinder link and the end head of a wire comprising sections of connected dumb-bell links, means for wrapping said piece of wire about said head of said dumb-bell link and said end head of said wire so that said two last-mentioned heads are imprisoned within the newly formed cylindrical link, and means for severing a new dumb-bell section from said dumb-bell wire, said new section including one of said last-mentioned imprisoned heads.

38. In apparatus of the geenral nature of that herein described, in combination, means holding a cylinder having flanges at its opposite ends and retaining one head of a dumb-bell link so that the other head of said link projects therefrom, means holding a dumb-bell wire so that the end head thereof lies adjacent said first-mentioned head, means for placing a piece of channeled wire so that said adjacent heads lie within the flanges, means coacting with said last-mentioned means for wrapping said piece of channeled wire about said heads to form a cylinder similar in shape to said first-mentioned cylinder, said second-mentioned means adapted to feed said dumb-bell wire toward said first-mentioned means after the operation of said last-mentioned means, and means associated with said second-mentioned means for severing a link from said dumb-bell wire during said movement.

39. In apparatus of the general nature of that herein described, in combination, a table, a member mounted to slide horizontally with respect to said table, a sleeve member mounted in said last-mentioned member to slide vertically with respect to said table, a pair of jaw members pivotally mounted at the upper end of said sleeve member, actuating means associated with said sleeve member and adapted to act on said jaw members to force the upper end portions thereof toward each other, means for dropping pieces of channeled wire so that the open ends thereof lie adjacent said jaw members, means for moving said first-mentioned member along said table to a new position beneath the free ends of a pair of dumb-bell links, and means for raising said sleeve member upwardly so that the heads of said dumb-bell links lie within the flanges of said piece of channeled wire, said actuating means adapted to operate after said sleeve member has reached said upper position.

40. In apparatus of the general nature of that herein described, in combination, a table, a block member mounted to slide horizontally with respect to said table, a sleeve member mounted to slide vertically within said block member, said sleeve member culminating at its upper end in a pair of spaced supports, a pair of right angle jaw members pivotally mounted opposite each other in said supports, a T-shaped sleeve member the upper end of which lies in engagement with the lower end portions of said jaw members, a tool member extending through said T-shaped member and between said jaw members, means for dropping a piece of channeled wire between the upper end portions of said jaw members when said tool member is in an upper position and said upper end portions of said jaw members are spaced from each other, said piece of channeled wire adapted to assume a position whereby its open ends are in registry with the upper end portions of said jaw members, means for moving said block member along said table to a new position, means for raising said first-mentioned sleeve member so that the flanges of said piece of channeled wire lie outside the heads of two adjoining dumb-bell links, means for releasing said tool member from its position between said jaw members, and means for moving said T-shaped sleeve member in an upward direction to move the upper end portions of said jaw members toward each other and wrap said piece of channeled wire about said heads of said dumb-bell links.

41. In apparatus of the general nature of that herein described, in combination, a table, a block adapted to slide horizontally with respect to said table, said block adapted to retain a piece of dumb-bell wire, a block member slidably mounted upon said table to move substantially at right angles to said first-mentioned block, a sleeve member mounted in said block member to move vertically with respect to said table, a pair of jaws pivotally mounted at the upper end of said sleeve member, means for dropping a piece of channeled wire between the upper end portions of said jaws when they are open, means adapted to move said block member so that said jaws and said piece of channeled wire lie beneath the end head of said piece of dumb-bell wire and one head of a free dumb-bell link, means for moving said sleeve member into an upper position so that said heads lie within the flanges of said piece of channeled wire, means for moving the upper portion of said jaws toward each other to wrap said channeled piece of wire about said heads, means for moving said block to force said heads into a new position, and means for severing the end dumb-bell link from said dumb-bell wire, said last-mentioned means associated with said block.

42. The herein described art which consists in disposing dumb-bell in alignment with each other, moving a piece of channeled wire into a position so that adjacent heads of two of said links lie within the flanges of said piece of channeled wire, bending said piece of channeled wire into a cylindrical form about said adjacent heads of said dumb-bell links to form a retaining cylinder therefor, moving said cylinder to a new position so that the exposed head of one of said two dumb-bell links is adjacent the head of a third dumb-bell link, placing a piece of channeled wire in a position so that said adjacent heads of said last two mentioned dumb-bell links lie within the flanges of said last-mentioned piece of channeled wire, and bending said last-mentioned piece of channeled wire about said last-mentioned adjacent heads to form a retaining cylinder therefor.

43. The herein described art which consists in relating a piece of channeled wire with the adjacent heads of two dumb-bell links so that said adjacent heads lie within the flanges of said piece of channeled wire, bending said piece of channeled wire about said adjacent heads of said dumb-bell links to form a retaining member therefor, relating the exposed head of one of said two dumb-bell links adjacent the head of a third dumb-bell link so that said last two mentioned heads lie within the flanges of a second piece of channeled wire, and wrapping said second piece of channeled wire about said last-mentioned heads to form a retaining member therefor.

44. The herein described art which consists in assembling a pair of dumb-bell links so that two heads thereof lie adjacent each other, assembling with respect thereto a piece of channeled wire so that said adjacent heads lie within the flanges of said piece, wrapping said piece of channeled wire about said heads, assembling the exposed head of one of said dumb-bell links with the head of a third link so that said two heads lie adjacent each other, assembling with respect to said last two mentioned heads a second piece of channeled wire so that said last two mentioned heads lie within the flanges thereof, and wrapping said second piece of channeled wire about said last two mentioned heads.

45. The herein described art which consists in disposing the adjoining heads of a pair of dumb-bell links in registry with a piece of channeled wire so that the respective heads lie within the flanges of said piece of wire, bending said piece of wire into cylindrical form about said heads, moving the resultant cylinder and said links to a new position so that the opposite head of one of said links lies adjacent the head of a new dumb-bell link, cutting a new piece of channeled wire, moving said last-mentioned piece of channeled wire so that the flanges thereof lie outside of said last-mentioned heads, and wrapping said last-mentioned piece of channeled wire about said last-mentioned heads to form a retaining member therefor.

46. The herein described art which consists in disposing a piece of dumb-bell wire so that the end head thereof is adjacent one head of a dumb-bell link, placing a piece of channeled wire so that said last two mentioned heads lie within the flanges thereof, wrapping said piece of channeled wire about said last two mentioned heads to form a retaining member therefor, moving said dumbbell wire and said retaining member to a new position, severing one link from said channeled wire so that the free head of the newly formed link and the new end head of said dumb-bell wire occupy substantially the same position as said first-mentioned heads before said movement, and wrapping a piece of channeled wire about said last-mentioned heads to form a retaining member therefor.

47. The herein described art which consists in disposing a piece of dumb-bell wire so that the end head thereof adjoins one head of a dumb-bell link, placing a piece of channeled wire so that said last two mentioned heads lie within the flanges thereof, wrapping said piece of channeled wire about said last two mentioned heads to form a retaining member therefor, moving said dumb-bell wire and said retaining member to a new position, severing one link from said dumb-bell wire so that the free head of said newly formed link lies adjacent the new end head of said dumb-bell wire, and wrapping another piece of channeled wire about said last two mentioned heads.

48. The herein described art which consists in relating the end head of a length of dumbbell wire to one head of a dumb-bell link so that said heads lie adjacent each other, relating a piece of channeled wire to said last two mentioned heads so that said heads lie within the flanges thereof, wrapping said piece of channeled wire about said heads, severing the end dumb-bell link from said dumb-bell wire so that the free head of said newly formed dumb-bell link is adjacent the end head of said dumb-bell wire, and wrapping a second piece of channeled wire about said last two mentioned heads.

49. In a device of the character described, in combination, means for receiving a piece of channeled wire, means for closing the ends of said piece of channeled wire about one head of a dumb-bell link and the end head of a dumb-bell wire to retain said heads against endwise displacement, and means for severing successively a dumb-bell link from said wire including said end head.

50. In a device of the character described, in combination, means for receiving pieces of channeled wire, means for disposing adjoining heads of pairs of dumb-bell links within the flanges of each of said pieces of channeled wire, one of said links being a portion of a dumb-bell wire, and means for closing the ends of each of said pieces of channeled wire about said heads of said dumb-bell links to retain said links against endwise displacement therefrom.

51. In a device of the character described, in combination, means for receiving pieces of channeled wire, means for disposing the adjoining ends of pairs of dumb-bell links within the flanges of each of said pieces of channeled wire, means for closing the ends of said pieces of channeled wire about said heads of said dumb-bell links to form a cylinder link, and means for repositioning said cylinder link so that the head of a dum-bell link extending therefrom lies within a flange of the next succeeding piece of channeled wire.

52. In a device of the character described, in combination, means for receiving pieces of channeled wire, members positioned adjacent said receiving means for supporting said pieces of wire on each of said receiving means, means for disposing the ends of dumb-bell links on said pieces of channeled wire, said members adapted to close the open ends of said pieces of channeled wire about said ends of said dumb-bell links to form substantially cylindrical links having inwardly extending flanges, and means for severing one of said dumb-bell links from a dumb-bell wire.

53. In a device of the character described, in combination, means for cutting individual pieces of channeled wire, means for receiving each piece of said channeled wire, members positioned adjacent said receiving means for supporting said piece of wire on said receiving means, said last-mentioned means and said members acting to transport said piece of wire to a new position beneath the adjoining heads of pairs of dumb-bell links so that said heads lie within the flanges of said piece of channeled wire, one of said dumb-bell links being a portion of a dumb-bell wire, means for closing said ends of said piece of channeled wire about said heads of said pairs of dumb-bell links to form a cylindrical link to retain said dumb-bell links against endwise displacement therefrom, means for severing said one dumb-bell link from said wire and repositioning said cylindrical link so that the head of said one dumb-bell link extending therefrom is in substantial registry with the inner portion of the next piece of channeled wire when said next piece of channeled wire assumes its new position, and means for feeding channeled wire to said cutting means.

54. In a device of the character described, in combination, means for cutting individual pieces of channeled wire, means for receiving each piece of channeled wire, means for transporting said piece of channeled wire to a new position beneath the free end of a dumb-bell link and the end head of a dumb-bell wire, means for closing said ends of said piece of channeled wire about said heads to form a cylindrical link to retain them against endwise displacement therefrom. and means for repositioning said cylindrical link so formed so that each dumb-bell link extending therefrom lies in substantial registry with the next piece of channeled wire when said piece of channeled wire assumes said new position.

55. In a device of the character described, in combination, means for severing individual pieces of channeled wire from a strip of channeled wire, means for relating each of said pieces of channeled wire to the adjoining heads of pairs of dumb-bell links, and means for wrapping each piece of channeled wire about said heads.

56. In a device of the character described, in combination, means for severing individual pieces of channeled wire from a strip of channeled wire, means for receiving each of said pieces of channeled wire from said severing means, said receiving means adapted to relate each piece of channeled wire to the adjoining heads of pairs of dumb-bell links, and means for wrapping each of said pieces of channeled wire about said heads.

57. In a device of the character described, in combination, means for severing individual pieces of channeled wire from a strip of channeled wire, means for receiving each of said pieces of channeled wire from said severing means, said receiving means adapted to relate each piece of channeled wire to the adjoinng heads of pairs of dumb-bell links, and means for wrapping each of said pieces of channeled wire about said heads, said last-mentioned means being operatively related to said receiving means.

58. In a device of the character described, in combination, means for relating a piece of channeled wire to the ajoining heads of a pair of dumb-bell links so that said heads lie within the flanges of said channeled wire, and means for wrapping said piece of channeled wire about said heads to form a retaining member therefor.

59. In a device of the character described, in combination, means for relating a piece of channeled wire to the adjoining heads of a pair of dumb-bell links so that said heads lie within the flanges of said channeled wire, means for wrapping said piece of channeled wire about said heads to form a retaining member therefor, and means for moving said retaining member to a new position so that the exposed head of one of said dumb-bell links lies adjacent the head of a third dumb-bell link, said heads being in registry with said wrapping means.

60. In a device of the character described, in combination, means adapted to form individual pieces of channeled wire, means for relating each of said pieces of channeled wire to the adjoining heads of pairs of dumb-bell links so that said heads lie within the flanges of said pieces of channeled wire, and means for wrapping each of said pieces of channeled wire about said heads.

61. In a device of the character described, in combination, means for cutting individual pieces of channeled wire from a strip of channeled wire, and means for receiving said pieces of channeled wire and adapted to bend the end portions of said channeled wire upwardly, said receiving means adapted to relate each of said pieces of channeled wire to the adjoining heads of pairs of dumb-bell links, said receiving means adapted to wrap said pieces of channeled wire about said heads.

62. In a device of the character described, in combination, means for cutting individual pieces of channeled wire from a strip of channeled wire, means for receiving said pieces of channeled wire, said receiving means adapted to relate each of said pieces of channeled wire to the adjoining heads of pairs of dumb-bell links, and means coacting with said receiving means adapted to bend the end portions of said channeled wire upwardly, said last-mentioned means adapted to wrap subsequently said pieces of channeled wire about said heads.

63. The herein described art which consists in forming a piece of metal with flanges at its sides, and wrapping said piece of metal about the adjoining heads of a pair of dumb-bell links to form a retaining member therefor.

64. The herein described art which consists in forming a piece of channeled wire, bending the ends of said piece of wire upwardly, and wrapping said piece of channeled wire in cylinder fashion about the adjoining heads of a pair of dumb-bell links.

65. The herein described art which consists in forming a piece of channeled wire, wrapping said piece of channeled wire about the adjoining heads of a pair of dumb-bell links, forming a second piece of channeled wire, and wrapping said second piece of channeled wire about the exposed head of one of said first-mentioned dumb-bell links and the adjoining head of a third dumb-bell link.

66. The herein described art which consists in forming a piece of channeled wire, bending the opposite ends of said piece of wire upwardly, wrapping said piece of wire about the adjoining heads of a pair of dumb-bell links, forming a second piece of channeled wire, bending the opposite ends of said last-mentioned piece of wire upwardly, and wrapping said last-mentioned piece of wire about the exposed head of one of said first-mentioned links and the adjoining head of a third dumb-bell link.

In testimony whereof, I have signed my name to this specification this third day of July, 1931.

CHRISTIAN KOHM.

CERTIFICATE OF CORRECTION.

Patent No. 1,886,194. November 1, 1932.

CHRISTIAN KOHM.

It is hereby certified that error appears in the printed specification of the above numbered patent requiring correction as follows: Page 5, line 3, for "up" read "upon"; page 15, line 2, claim 36, strike out the words "from said"; and that the said Letters Patent should be read with these corrections therein that the same may conform to the record of the case in the Patent Office.

Signed and sealed this 17th day of January, A. D. 1933.

(Seal)

Acting Commissioner of Patents.
M. J. Moore,